(12) United States Patent
Liang

(10) Patent No.: US 10,475,224 B2
(45) Date of Patent: Nov. 12, 2019

(54) REALITY-AUGMENTED INFORMATION DISPLAY METHOD AND APPARATUS

(71) Applicant: Tencent Technology (Shenzhen) Company Limited, Shenzhen (CN)

(72) Inventor: Yuan Liang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 26 days.

(21) Appl. No.: 15/867,549

(22) Filed: Jan. 10, 2018

(65) Prior Publication Data

US 2018/0130244 A1 May 10, 2018

Related U.S. Application Data

(63) Continuation-in-part of application No. PCT/CN2017/071343, filed on Jan. 17, 2017.

(30) Foreign Application Priority Data

Jan. 18, 2016 (CN) .......................... 2016 1 0032592

(51) Int. Cl.
*G06T 11/60* (2006.01)
*H04W 4/02* (2018.01)
(Continued)

(52) U.S. Cl.
CPC ............ *G06T 11/60* (2013.01); *G06T 19/006* (2013.01); *H04L 29/08* (2013.01); *H04W 4/023* (2013.01)

(58) Field of Classification Search
None
See application file for complete search history.

(56) References Cited

U.S. PATENT DOCUMENTS 8,803,912 B1 * 8/2014 Fouts .................... G06T 19/006
345/629
9,432,421 B1 * 8/2016 Mott ..................... H04W 4/025
(Continued)

FOREIGN PATENT DOCUMENTS

CN 102006555 A 4/2011
CN 102708193 A 10/2012
(Continued)

OTHER PUBLICATIONS

Luckerson, "Make Your Facebook Profile More Private in 6 Easy Steps", URL: http://time.com/4166749/facebook-privacy-settings-guide/ (Year: 2016).*

(Continued)

*Primary Examiner* — David H Chu
(74) *Attorney, Agent, or Firm* — Morgan, Lewis & Bockius LLP

(57) ABSTRACT

This application discloses a reality-augmented information display method performed by a first terminal that is communicatively connected to a remote server. The method includes: obtaining a first geographical location of the first terminal and a first orientation of the camera; transmitting the first geographical location and the first orientation to the server; receiving, from the server, first information, wherein the first information is released by a second terminal at a second geographical location that is within a region defined by the first geographical location and the first orientation; determining a display location of the first information on the display of the first terminal according to the second geographical location within the region defined by the first geographical location and the first orientation; and displaying, at the display location, presentation information used to represent the first information while displaying a real-time image captured by the camera on the display.

17 Claims, 10 Drawing Sheets

(51) Int. Cl.
*G06T 19/00* (2011.01)
*H04L 29/08* (2006.01)

(56) References Cited

U.S. PATENT DOCUMENTS

| | | | | |
|---|---|---|---|---|
| 9,639,988 B2* | 5/2017 | Kasahara | ............... | G06T 19/006 |
| 2009/0289956 A1* | 11/2009 | Douris | ..................... | H04W 4/21 |
| | | | | 345/633 |
| 2010/0328344 A1* | 12/2010 | Mattila | ................. | G06F 1/1626 |
| | | | | 345/633 |
| 2011/0294467 A1* | 12/2011 | Kim | ...................... | G06F 1/1643 |
| | | | | 455/411 |
| 2012/0015675 A1 | 1/2012 | Suetsugu et al. | | |
| 2012/0088526 A1* | 4/2012 | Lindner | ............ | H04M 1/72522 |
| | | | | 455/457 |
| 2012/0105474 A1* | 5/2012 | Cudalbu | ................. | G01C 21/20 |
| | | | | 345/633 |
| 2012/0330789 A1* | 12/2012 | Heck | ....................... | G06Q 10/06 |
| | | | | 705/26.41 |
| 2013/0044129 A1* | 2/2013 | Latta | ......................... | G09G 5/00 |
| | | | | 345/633 |
| 2013/0113804 A1* | 5/2013 | Ferman | ................. | G06T 11/206 |
| | | | | 345/440 |
| 2013/0187952 A1* | 7/2013 | Berkovich | ................ | G01S 5/16 |
| | | | | 345/633 |
| 2013/0342564 A1* | 12/2013 | Kinnebrew | ............ | G09G 3/003 |
| | | | | 345/619 |
| 2015/0039635 A1* | 2/2015 | Monjas Llorente | .. | H04L 65/605 |
| | | | | 707/754 |
| 2015/0070347 A1* | 3/2015 | Hofmann | ........... | G06K 9/00208 |
| | | | | 345/419 |
| 2015/0117796 A1 | 4/2015 | Hile et al. | | |
| 2015/0248783 A1* | 9/2015 | Fayle | ...................... | G06F 16/58 |
| | | | | 345/633 |
| 2016/0033770 A1* | 2/2016 | Fujimaki | ............... | G06T 19/006 |
| | | | | 345/8 |
| 2016/0049013 A1* | 2/2016 | Tosas Bautista | ...... | G06T 19/006 |
| | | | | 345/633 |
| 2016/0332059 A1* | 11/2016 | Seeff | .................... | A63C 11/003 |
| 2016/0377381 A1* | 12/2016 | Lyren | ....................... | F41G 3/04 |
| | | | | 345/633 |
| 2017/0132843 A1* | 5/2017 | Fan | ....................... | G06T 19/006 |
| 2018/0293771 A1* | 10/2018 | Piemonte | ............. | G06Q 20/123 |

FOREIGN PATENT DOCUMENTS

| | | |
|---|---|---|
| CN | 103107938 A | 5/2013 |
| CN | 103186677 A | 7/2013 |
| CN | 103379165 A | 10/2013 |
| CN | 103971589 A | 8/2014 |
| CN | 104598504 A | 5/2015 |
| CN | 104748740 A | 7/2015 |
| CN | 104881124 A | 9/2015 |

OTHER PUBLICATIONS

Tencent Technology, ISRWO, PCT/CN2017/071343, Mar. 31, 2017, 6 pgs.
Tencent Technology, IPRP, PCT/CN2017/071343, Jul. 24, 2018, 5 pgs.

* cited by examiner

REALITY-AUGMENTED INFORMATION DISPLAY METHOD AND APPARATUS

PRIORITY CLAIM AND RELATED APPLICATION

This application is a continuation-in-part application of PCT/CN2017/071343, entitled "INFORMATION DISPLAY METHOD AND APPARATUS" filed on Jan. 17, 2017, which claims priority to Chinese Patent Application No. 201610032592.4, filed with the State Intellectual Property Office of the People's Republic of China on Jan. 18, 2016, and entitled "INFORMATION DISPLAY METHOD AND APPARATUS", all of which are incorporated herein by reference in their entirety.

FIELD OF THE TECHNOLOGY

This application relates to the social field, and specifically, to a reality-augmented information display method and apparatus.

BACKGROUND OF THE DISCLOSURE

With development of intelligent terminals and mobile Internet technologies, people often release their experience by using a terminal. For example, people may release information in some forums such as a tourism forum or a food forum; or may release their travels, food comments, or the like on a social platform; or may release comments on a tourist destination, a restaurant, a service, or the like in a dedicated comment platform. When people need to learn information released by others about a place, a restaurant, a service, or the like, they may log in to each platform, and search each platform for information that interests them, or may search, by using a search engine, for content that interests them.

SUMMARY

Embodiments of this application provide an information display method and apparatus, so as to at least resolve a technical problem that a location of a terminal sending information cannot be accurately displayed.

An embodiment of this application provides an information display method performed by a first terminal having at least one processor and memory storing at least one program to be executed by the at least one processor, wherein the first terminal has an associated camera and an associated display and is communicatively connected to a remote server, the method comprising including: obtaining a first geographical location of the first terminal and a first orientation of the camera; transmitting the first geographical location and the first orientation to the server; receiving, from the server, first information, wherein the first information is released by a second terminal at a second geographical location that is within a region defined by the first geographical location and the first orientation; determining a display location of the first information on the display of the first terminal according to the second geographical location within the region defined by the first geographical location and the first orientation; and displaying, at the display location, presentation information used to represent the first information while displaying a real-time image captured by the camera on the display.

An embodiment of this application further provides a first terminal having at least one processor, a camera, a display, memory and at least one program stored in the memory. The first terminal is communicatively connected to a remote server, and the at least one program, when executed by the at least one processor, causes the first terminal to perform the aforementioned information display method.

An embodiment of this application further provides a non-transitory computer-readable storage medium storing a plurality of computer executable instructions that, when at least one processor of a first terminal that has a camera and a display and is communicatively connected to a remote server, cause the first terminal to perform the aforementioned information display method.

In the embodiments of this application, according to a first geographical location of a first terminal, first information associated with a second geographical location whose distance to the first geographical location is within a range of a preset distance is obtained, a display location of the first information on the first terminal is determined according to the second geographical location, and presentation information used to represent first information is displayed at the display location. In this way, according to a location of a user, other information that was sent near the location is proactively presented to the user.

BRIEF DESCRIPTION OF THE DRAWINGS

The accompanying drawings described herein are used to provide further understanding of this application, and form a part of this application. Exemplary embodiments of this application and descriptions thereof are used for explaining this application, but do not constitute an improper limitation to this application. In the accompanying drawings.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

It should be noted that, In the specification, claims, and accompanying drawings of this application, the terms "first", "second", and so on are intended to distinguish between similar objects but do not necessarily indicate a specific order or sequence. It should be understood that the data termed in such a way are interchangeable in proper circumstances so that the embodiments of this application described herein can be implemented in orders except the order illustrated or described herein. In addition, the terms "including", "having", or any other variant thereof are intended to cover a non-exclusive inclusion. A process, a method, a system, a product, or a device described herein is not necessarily limited to the listed operations or units, but may further include an unlisted operation or unit.

The operations shown in the accompanying drawings of this application may be performed in, for example, a computer system having a set of computer executable instructions. An order of the operations shown in the flowcharts is merely exemplary, and in other embodiments, the operations may be performed in another order.

According to an embodiment of this application, an information display method is provided.

Figure 1:
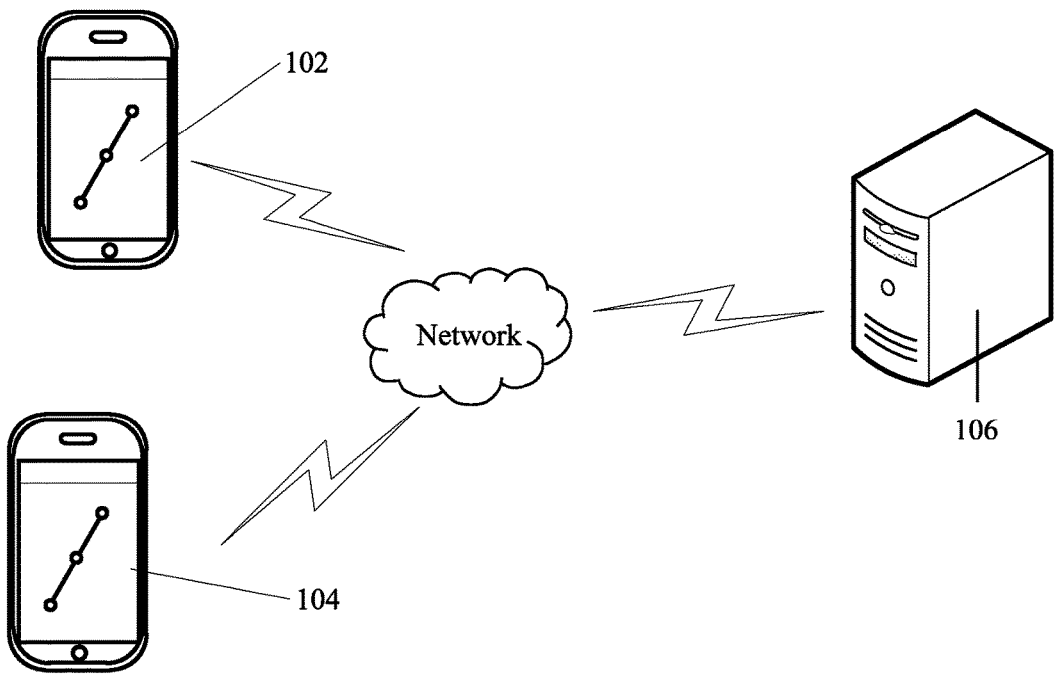
FIG. 1 is an architectural diagram of a hardware structure according to an embodiment of this application.

The information display method in the embodiments may be applied to a hardware environment formed by a first terminal 102, a second terminal 104, and a server 106 shown in FIG. 1. As shown in FIG. 1, the first terminal 102 and the second terminal 104 are connected to the server 106 by using a network. The network includes, but is not limited to, a mobile communications network, a wide area network, a metropolitan area network, or a local area network. The first terminal 102 and the second terminal 104 may be mobile phone terminals, or may be PC terminals, notebook computer terminals, or tablet computer terminals. In FIG. 1, only two terminals are shown. Actually, there may be a large quantity of terminals.

A main working principle of the hardware environment shown in FIG. 1 is as follows: A first geographical location of the first terminal 102 is recorded by using a positioning function of the first terminal 102. The first terminal 102 obtains, from the server 106, a second geographical location of the second terminal 104 and first information sent by the second terminal 104. The second terminal 104 is positioned by using a positioning function of the second terminal 104, to obtain the second geographical location, and sends the second geographical location to the server 106. The first terminal 102 displays presentation information on the first terminal 102 according to a distance between the first geographical location and the second geographical location, where the presentation information is used to represent the first information and the second geographical location.

Figure 2:
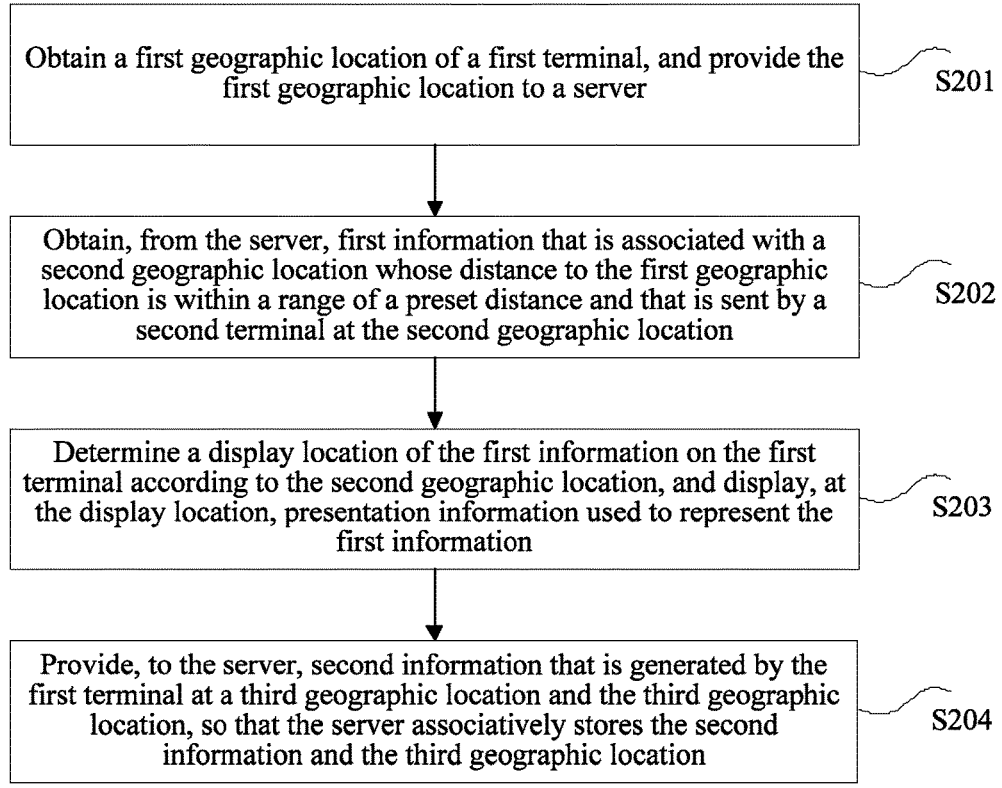
FIG. 2 is a flowchart of an information display method according to an embodiment of this application.

FIG. 2 is a flowchart of an information display method according to an embodiment of this application. As shown in FIG. 2, the method may include the following operations:

Operation S201: Obtain a first geographical location of a first terminal, and provide the first geographical location to a server.

Operation S202: Obtain, from the server, first information associated with a second geographical location whose distance to the first geographical location is within a range of a preset distance.

Operation S203: Determine a display location of the first information on the first terminal according to the second geographical location, and display, at the display location, presentation information used to represent the first information.

Operation S204: Provide, to the server, second information that is generated by the first terminal at a third geographical location and the third geographical location, so that the server associatively stores the second information and the third geographical location.

According to this embodiment of this application, information sent by a user and a location at which the information is sent are associatively stored, and when the user arrives at a location, information that was sent around the location is proactively presented to the user, thereby implementing user interaction across time based on a geographical location.

The method in the embodiments may be performed by a terminal device of a user, for example, may be performed by a hardware module, stored code, or a running program in the terminal device.

A geographical location of the first terminal may be obtained by using various positioning technologies. For example, the geographical location of the first terminal may be obtained by using a positioning technology in a cellular mobile communications network. For another example, the geographical location of the first terminal may be obtained by using a wireless positioning technology, such as a triangle positioning technology of wireless access points. For still another example, the geographical location of the first terminal may be obtained by using a satellite positioning system such as a GPS. In some embodiments, the first terminal includes one or more sensors (e.g., a multi-axis gyroscope, accelerometer, magnetometer, etc.) for detecting its orientation.

In some embodiments, the first terminal has a camera and a display built-in into the terminal. When a user of the first terminal turns on the camera application and points the terminal in a first orientation. An image of objects located along the first orientation appears on the display. The first terminal transmits an information retrieval request including both the first geographical location and the first orientation to the server. The server stores or has access to a database storing multiple pieces of information released by other terminals before, each piece of information having an associated geographical location of a terminal that submits the information. In some embodiments, the piece of information includes a camera orientation of the terminal if the information includes an image captured by the corresponding terminal's camera. In some embodiments, each piece of information further includes a release time corresponding to the time when the server receives the information from a corresponding terminal. In some embodiments, when a terminal releases a piece of information to the server, there is a user-provided requirement about how the piece of information is to be shared with other terminals in the future. For example, a time window may be imposed by the user of the releasing terminal such that the piece of information is only available for a predefined period of time (e.g., ranging from a few days to a few months). In some embodiments, the information sharing method is part of a social networking application supporting by the hardware environment depicted in FIG. 1. When a terminal releases a piece of information, it may include a corresponding user identifier of the social networking application associated with the terminal in the information to be released. In addition, the user of the terminal can specify whether the piece of information is to be shared with any terminal using the social networking application or those terminals whose associated user identifiers have a pre-existing relationship with the user identifier of the releasing terminal. For example, the user of the releasing terminal may limit the sharing of the piece of information to those user identifiers that are marked as friends, family members, or colleagues of the user identifier of the releasing terminal by the social networking application.

The server, upon receipt of the information retrieval request, queries the database for one or more pieces of information released by other terminals before that match the first geographical location and the first orientation of the first terminal. Based on the user-provided sharing requirements of the multiple pieces of information, the server identifies those pieces of information including the first information that satisfy the location-based, temporal-based and user-provided sharing requirements and returns them to the first terminal for display. After receiving the first information (e.g., a message) released by a second terminal at a second geographical location that is within a region defined by the first geographical location and the first orientation, the first terminal determines a corresponding display location of the first information on the display of the first terminal according to the second geographical location within the region defined by the first geographical location and the first orientation.

In some embodiments, the region defined by the first geographical location and the first orientation is a fan-shaped region in front of the first terminal when the camera of the first terminal is pointing in the first orientation from the first geographical location. For example, if the user of the first terminal is pointing its camera at a restaurant from outside, it is assumed that the user is probably interested in the comments customers of the restaurant have posted while they were dining at the restaurant before. If the server returns multiple pieces of information including the first information, each piece being posted by a respective terminal, the first terminal needs to decide a unique display location for each first information. Such display location may be dependent upon a distance between the first information's corresponding second geographical location. For example, when the first information's associated second geographical location is too far from the first geographical location (e.g., exceeding a predefined distance between the two geographical locations), it is assumed that the first information may not be too relevant to the user of the first terminal. Similarly, the first information may not be too relevant to the user of the first terminal when an angle between the second geographical location and the first geographical location and the first orientation is not within the fan-shaped region. This is particularly important because, in a very crowded downtown, a slight change in a camera's orientation may capture a totally different target. Therefore, the geographical location of the first terminal and the orientation of the first terminal's camera may be two independent requirements when the server selects relevant pieces of information to be returned to the first terminal. When multiple pieces of information are returned to the first terminal for display, the first terminal may determine a unique display location for each piece of information. Using the first information released by the second terminal as an example, the first terminal determines the display location based on the spatial relationship between the first terminal and the second terminal (including their geographical locations and orientations) and displays, at the display location, presentation information used to represent the first information while displaying a real-time image captured by the camera on the display.

In some embodiments, a snippet of the first information is rendered at the display location as the presentation information. In response to a user selection of the snippet, the first terminal then replaces the snippet with a full version of the first information on the display. This is particularly important if the server returns multiple pieces of information including the first information and the first terminal has to strike a balance between displaying as much information as possible and emphasizing each piece of information according to its relevance to the user of the first terminal while avoiding overwhelming the user of the first terminal with too much information. For example, each piece of information has a unique "freshness" measured by a time difference between a piece of information's release time and the current time. Based on such information, the first terminal may give those more recent pieces of information a more prominent display location and/or a bigger size. In some embodiments, the first terminal may treat those pieces of information released by somebody who has a pre-existing relationship with the user of the first terminal a more prominent display position as well as display size.

In some embodiments, the presentation information of the first information is overlaid on top of the real-time image. When the user of the first terminal moves the first terminal around, including its geographical location and orientation, the first terminal updates the display location of the presentation information corresponding to each piece of information on the display of the first terminal accordingly. For example, a piece of information that was on the display of the first terminal before may disappear from the display while another piece of information that was not on the display of the first terminal before may appear on the display for the first time. This process may include one or more multiple communications between the first terminal and the server.

In some embodiments, in response to a user instruction to the first terminal, the first terminal generates second information including a third geographical location of the first terminal, a current orientation of the first terminal, and a user identifier of the social networking application, and submits the second information to the server. The server then stores the second information according to the third geographical location and a release time corresponding to the second information. In some embodiments, the second information includes a user-provided requirement for sharing the second information with another terminal submitting its geographical location and its camera's orientation to the server.

There may be one or more pieces of information including the first information obtained in operation S202, and the first information may be information that is provided to the server in operation S204 when the first terminal or another terminal once performed the method. For example, some time ago, the second terminal provided the first information and information about the second geographical location to the server at the second geographical location, and the server associatively stored the first information and the second geographical location. When receiving the first geographical location of the first terminal, and determining that the distance between the second geographical location and the first geographical location is within the range of the preset distance, the server provides the first information and the second geographical location to the first terminal.

In some examples, in operation S203 of determining the display location of the first information on the first terminal according to the second geographical location, a directional relationship between the second geographical location and the first geographical location may be determined, and the display location may be determined in a display area of the first terminal according to the directional relationship, where a directional relationship between the display location and a preset location in the display area corresponds to the directional relationship. For example, when each piece of first information is displayed in the display area of the first terminal by using a simulated three-dimensional space, a direction that a user of the first terminal currently faces may be obtained, and the first information is displayed, in the simulated three-dimensional space, in a direction of the second geographical location relative to the first geographical location. For another example, when each piece of first information is displayed in the display area of the first terminal by using a two-dimensional plane, one point in the display area may be used as the first geographical location, and the first information may be displayed, according to a preset rule (for example, up (North)-down (South)-left (West)-right (East)) in the display area, in a direction of the second geographical location relative to the first geographical location.

In some examples, in operation S203 of determining the display location of the first information on the first terminal according to the second geographical location, the distance between the second geographical location and the first geographical location may be determined, and the display location may be determined in a display area of the first terminal according to the distance, where a distance between the display location and a preset location in the display area corresponds to the distance. For example, when each piece of first information is displayed in the display area of the first terminal by using a simulated three-dimensional space, the first information may be displayed, in the simulated three-dimensional space according to a perspective principle, at a location representing the distance between the second geographical location and the first geographical location. For another example, when each piece of first information is displayed in the display area of the first terminal by using a two-dimensional plane, one point in the display area may be used as the first geographical location, and the first information may be displayed, in the display area, at a location whose distance to the point can represent the distance between the second geographical location and the first geographical location. There may be various methods for converting the distance between the second geographical location and the first geographical location into a distance between two points in the display area. For example, the distance is reduced, according to a preset proportion, to a distance that can be displayed in the display area. Alternatively, first information having a longest distance to the first geographical location in multiple pieces of information including the first information is used for reference, a length in the display area is used to represent the longest distance, a distance between other first information and the first geographical location is converted into a proportion of the longest distance, and then, a corresponding length of a distance of each piece of first information in the display area is determined. A point in the display area is used to represent the first geographical location, and a distance between the display location of the first information and the point is determined according to a corresponding length of the distance of the first information in the display area.

According to the embodiments, according to a relationship between a geographical location of a user and a geographical location of information, the geographical location of the information is mapped to a corresponding location on a terminal of the user, so that the user can intuitively learn, according to a display location of the information, a relationship between the geographical location at which the information is sent and the location of the user.

In some examples, a background image corresponding to the first geographical location or the second geographical location may be also obtained. The background image is displayed on the first terminal, and in operation S203, the presentation information may be displayed in the background image in an overlaying manner. A background image may be an image of a real object (referred to as a real image), may be an image of a simulated three-dimensional space represented by auxiliary lines, may be an image of a two-dimensional plane represented by auxiliary lines, may be a map, or the like. For example, multiple straight lines representing perspective relationships may be included in an image of a simulated three-dimensional space represented by auxiliary lines. The straight lines intersect at one point, and an intersection point may be in the display area or may be outside the display area. For example, multiple straight lines that radiate outward from one point as a center may be included in an image of a two-dimensional plane represented by auxiliary lines. In some examples, an intersection point of the auxiliary lines may be used to represent a location, that is, the first geographical location of the first terminal, and one point whose distance to the intersection point is used to represent the distance between the second geographical location the first geographical location and that is on a straight line is used as the display location of the first information.

In some examples, when a real image is used as a background image, a presentation location of the first information may be determined by using the foregoing simulated three-dimensional space, and the first information may be displayed in the real image in an overlaying manner according to the determined presentation location. In this way, information may be presented by means of augmented reality, to create an information display scenario of a combination of virtuality and reality for a user.

In some examples, a real image used as a background image may change with a location of the first terminal. For example, when the first terminal moves from the first geographical location to the third geographical location, the third geographical location may be provided to the server, and a second real image corresponding to the third geographical location may be received from the server, as the background image; or a second real image that is photographed by the first terminal at the third geographical location may be obtained as the background image.

In some examples, the displayed first information and/or the display location of the first information may change with a location of the first terminal. For example, when the first terminal moves from the first geographical location to the third geographical location, the third geographical location may be provided to the server, and one or more pieces of third information whose distances to the third geographical location are within a range of a preset distance may be obtained. For another example, when the first terminal moves from the first geographical location to the third geographical location, a display location of the first information on the first terminal may be re-determined according to a relationship between the second geographical location and the third geographical location, and the first information may be displayed according to a display location obtained after update.

According to this embodiment of this application, a background image and displayed information are updated according to a change of a geographical location of a user, so that the user can intuitively obtain, by using moving locations, information corresponding to each location, to create a more realistic virtual reality scenario.

In some examples, information sent by a specified user may be provided. For example, a user identifier may be provided to the server. The user identifier may be input by the user of the first terminal or selected by the user of the first terminal from a user list. The user identifier may be a user identifier of the user of the first terminal, or may be a user identifier of another user, for example, an identifier of a friend or a contact of the user. First information associated with the second geographical location whose distance to the first geographical location is within the range of the preset distance, and associated with the user identifier is obtained from the server. Correspondingly, when performing operation S204, any terminal may provide a user identifier corresponding to the terminal, sent information, and geographical location information of the terminal to the server, for management and storage by the server. In this way, a user can obtain information that is sent by a user that interests the user around.

To satisfy different requirements of users, information may be classified into shared information and non-shared information. Shared information is information that is in the server and whose associated geographical location remains unchanged. Non-shared information is information that is in the server and whose associated geographical location is continuously updated with a change of a location of a terminal sending the information. In some examples, a selection interface may be provided on a user interface used to edit information or release information, for a user to choose to release the information as shared information or non-shared information. In some examples, different user interfaces may be provided for shared information and non-shared information, to determine whether information input by a user is used as shared information or non-shared information. In this way, the user may select whether information moves with the user or information is bound with a fixed geographical location, so that an information release mechanism is more flexible.

In some examples, in operation S204, the second information may be provided as shared information to the server, so that the server associatively stores the shared information and the third geographical location and sets the third geographical location to be invariable.

In some examples, in operation S204, the second information may be provided as non-shared information to the server, so that the server associatively stores the non-shared information and the third geographical location and updates, according to a change of a geographical location of the first terminal, the third geographical location that is associatively stored with the non-shared information.

In this embodiment of this application, each terminal may provide a change of a geographical location of the terminal to the server. For example, the terminal may obtain a geographical location at a preset time interval, and provide the geographical location to the server. For another example, the terminal may provide a current geographical location to the server when displacement reaches a preset threshold. For still another example, the terminal may provide a geographical location to the server in real time by using a persistent connection (such as a socket persistent connection) established between the terminal and the server.

Figure 3:
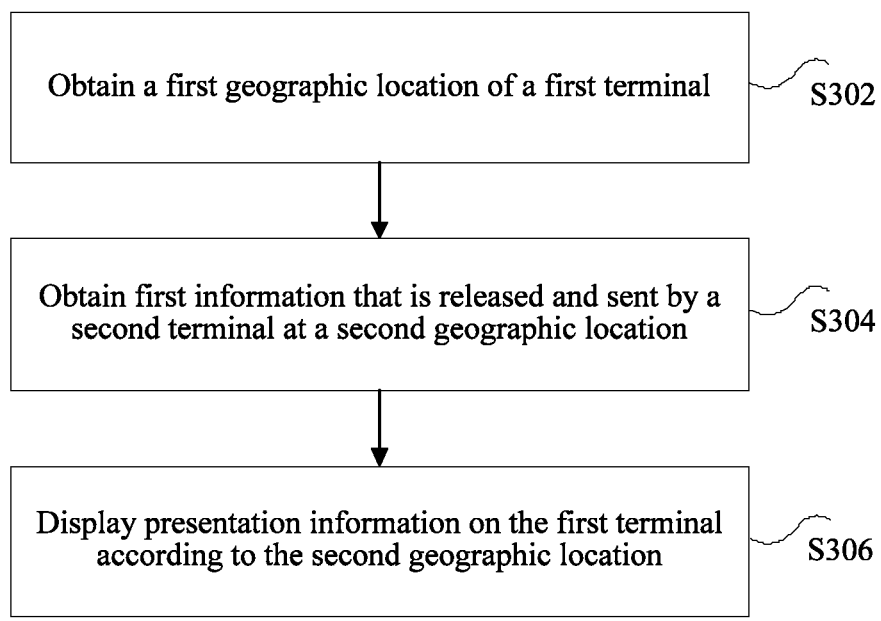
FIG. 3 is a flowchart of an information display method according to an embodiment of this application.

FIG. 3 is a flowchart of an information display method according to an embodiment of this application. The information display method is applied to a first terminal. As shown in FIG. 3, the information display method mainly includes the following operations.

Operation S302: Obtain a first geographical location of the first terminal. The first geographical location is a current location of the first terminal, and the first geographical location changes with movement of the first terminal.

Operation S304: Obtain first information that is sent by a second terminal at a second geographical location, where a distance between the second geographical location of the second terminal and the first geographical location is within a range of a preset distance.

The first information may be text information, image information, video information, audio information, or the like. The second geographical location is a location at which the second terminal sends the first information. The second geographical location may also be information that is released by the second terminal at a third geographical location, and is information that is sent by the second terminal when the second terminal moves from the third geographical location to the second geographical location. The obtaining first information that is sent by a second terminal at a second geographical location includes: obtaining shared information that is sent by the second terminal at the second geographical location, where the shared information is data shared by the second terminal at the second geographical location with the first terminal; or obtaining non-shared information that is sent by the second terminal at the second geographical location, where the non-shared information is released by the second terminal at the third geographical location, and when the second terminal moves from the third geographical location to the second geographical location, the second terminal sends the non-shared information at the second geographical location.

For example, the second terminal visits a scenic spot A in 2015, and releases "XXX is here" (that is, shared information) at the entrance of the scenic spot (that is, a second geographical location). The first terminal visits the scenic spot A in 2016, and obtains, near the entrance of the scenic spot, the information being "XXX is here" sent by the second terminal.

For example, the second terminal releases one piece of information being "I want to take a taxi to the Place" (that is, non-shared information) at an entrance of a restaurant (that is, a third geographical location). When the first terminal is at a crossroads (that is, a first geographical location), and the second terminal is located on the opposite side of a street of the crossroads at which the first terminal is located (that is, a second geographical location), a distance between the first terminal and the second terminal satisfies a range of a preset distance. In this case, the first terminal may obtain the information being "I want to take a taxi to the Place" that is released by the second terminal at the entrance of the restaurant. That is, the second terminal sends the information being "I want to take a taxi to the Place" at the crossroads, and the first terminal can obtain the information of the second terminal. If the first terminal also needs to take a taxi to the Place, or the first terminal is in a car heading to the Place, the first terminal may be invited, by using a message sent by the second terminal, to go to the Place together.

That is, the first information sent by the second terminal may be information that is already sent at the second geographical location (that is, shared information). Alternatively, the first information sent by the second terminal may be information carried by the second terminal at any time (that is, non-shared information), the second geographical location changes with movement of the second terminal, and when a requirement for the distance between the first geographical location and the second geographical location is satisfied, the information can be obtained by the first terminal.

Operation S306: Display presentation information on a first terminal according to the second geographical location, where the presentation information is used to represent the first information.

The first information and the second geographical location sent by the second terminal are displayed on the first terminal. If the first terminal sends information at the first geographical location, the information sent by the first terminal is further displayed on the first terminal.

By means of the foregoing embodiment, the first information and the second geographical location at which the first information is sent are associatively recorded. Therefore, when the distance between the first geographical location of the first terminal and the second geographical location satisfies a requirement of the range of the preset distance, the first terminal can obtain the first information that is sent by the second terminal at the second geographical location. During display of the first terminal, the displayed presentation information represents the second geographical location of the second terminal. Therefore, a technical problem that a location of a terminal sending information cannot be accurately displayed is resolved, and a technical effect of accurately displaying the location of the terminal sending the information is achieved.

In this embodiment, a geographical location of the first terminal and a geographical location of the second terminal may be obtained in real time by using positioning functions of the terminals. In addition, the first terminal searches for the first information sent by the surrounding second terminal, and the first information of the second terminal can be obtained as long as the distance between the first geographical location and the second geographical location is within the range of the preset distance, thereby improving convenience of obtaining the first information by the first terminal.

In a specific example, if the second terminal sends, at a restaurant, "The baked rice in pineapple in this restaurant is very delicious", the first terminal can obtain the information when passing through the restaurant. Alternatively, if the second terminal releases, on the way to a restaurant, "Who will have dinner with me", when the distance between the first geographical location of the first terminal and the second geographical location is within the range of the preset distance, the information is obtained. The first terminal may send an invitation to dinner to the second terminal. The invitation to dinner may be replied to the information being "Who will have dinner with me" released by the second terminal, to invite the second terminal to dinner. As can be learned, in this embodiment, the first terminal may search, according to the first information, for a scenic spot, a restaurant, a cinema, or the like that interests the first terminal, and may further exchange social information with another terminal according to the first information.

In this embodiment, interaction experience in a virtual world is enhanced through the real world by means of an augmented reality technology, so that the virtual world is combined with the real world. The real world is virtualized, each space point in the virtual world is positioned by using a longitude and a latitude and an altitude, so that a location of a terminal in the real world is embodied in the virtual world, and information sent by the terminal in the real world is also associated with a space point in the virtual world.

In some examples, the displaying presentation information on a first terminal according to the second geographical location includes: obtaining a background image corresponding to the second geographical location; and displaying the background image on the first terminal, and displaying the presentation information in the background image.

The background image is displayed on the first terminal, so that the presentation information is presented in the background image. Both the first information sent by the second terminal and information sent by the first terminal can be presented in the background image. In addition, the presentation information can present both the first information and the second geographical location at which the first information is sent.

The background image may use a real image or a default image. A real image may be an image photographed by the first terminal, the second terminal, or another terminal at the first geographical location, and may be photographed in real time or may be prestored in the server. A default image may be an image generated by the server. Such two types of background images are respectively described below.

First Type: Real Image.

In some examples, the obtaining a background image corresponding to the second geographical location includes: obtaining a first real image corresponding to the first geographical location, and using the first real image as the background image. The displaying the background image on the first terminal, and displaying the presentation information in the background image includes: displaying the first real image on the first terminal, and displaying the presentation information in the first real image of the first terminal.

Figure 4:
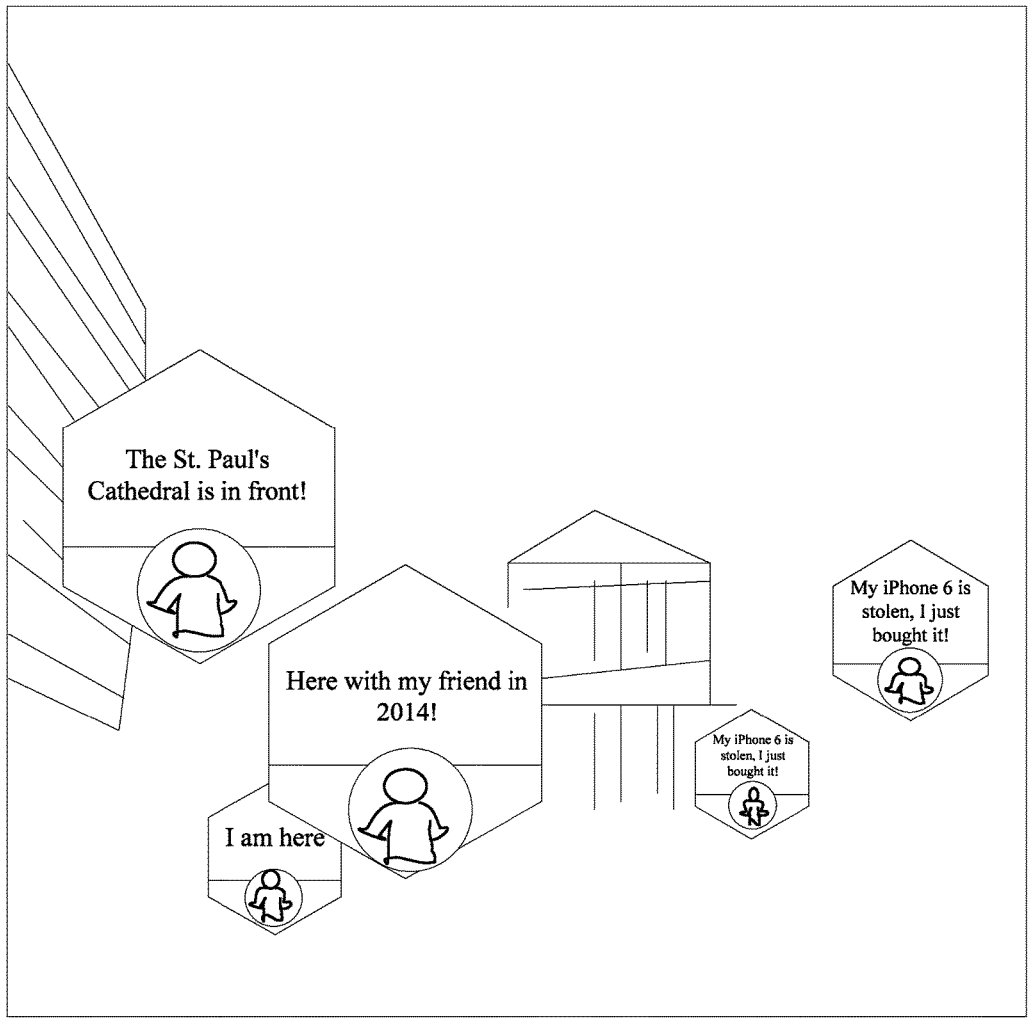
FIG. 4 is a schematic diagram of a first terminal using a real image of a scenic spot as a background image according to an embodiment of this application.
Figure 5A:
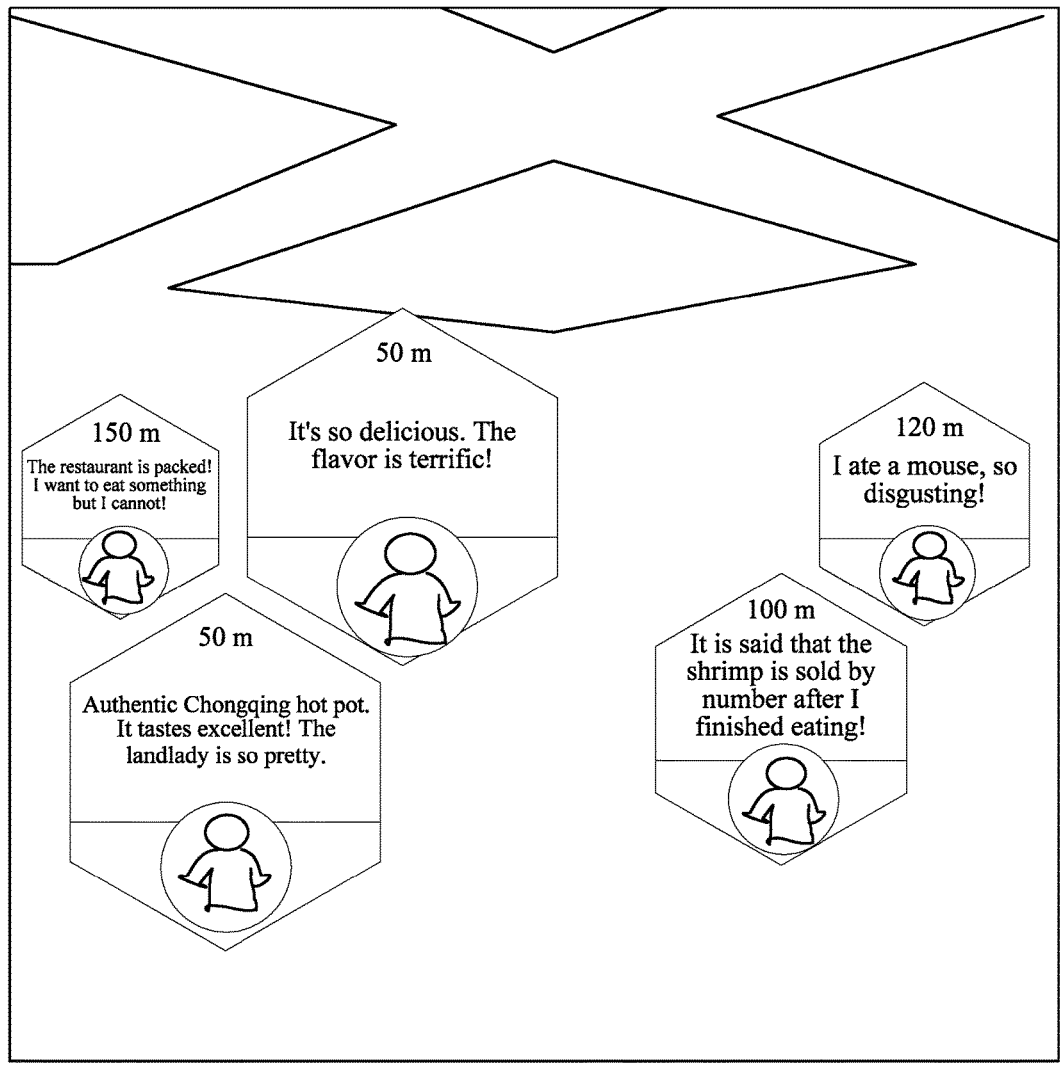
FIG. 5a is a schematic diagram of a first terminal using a real image of a restaurant as a background image according to an embodiment of this application.
Figure 5B:
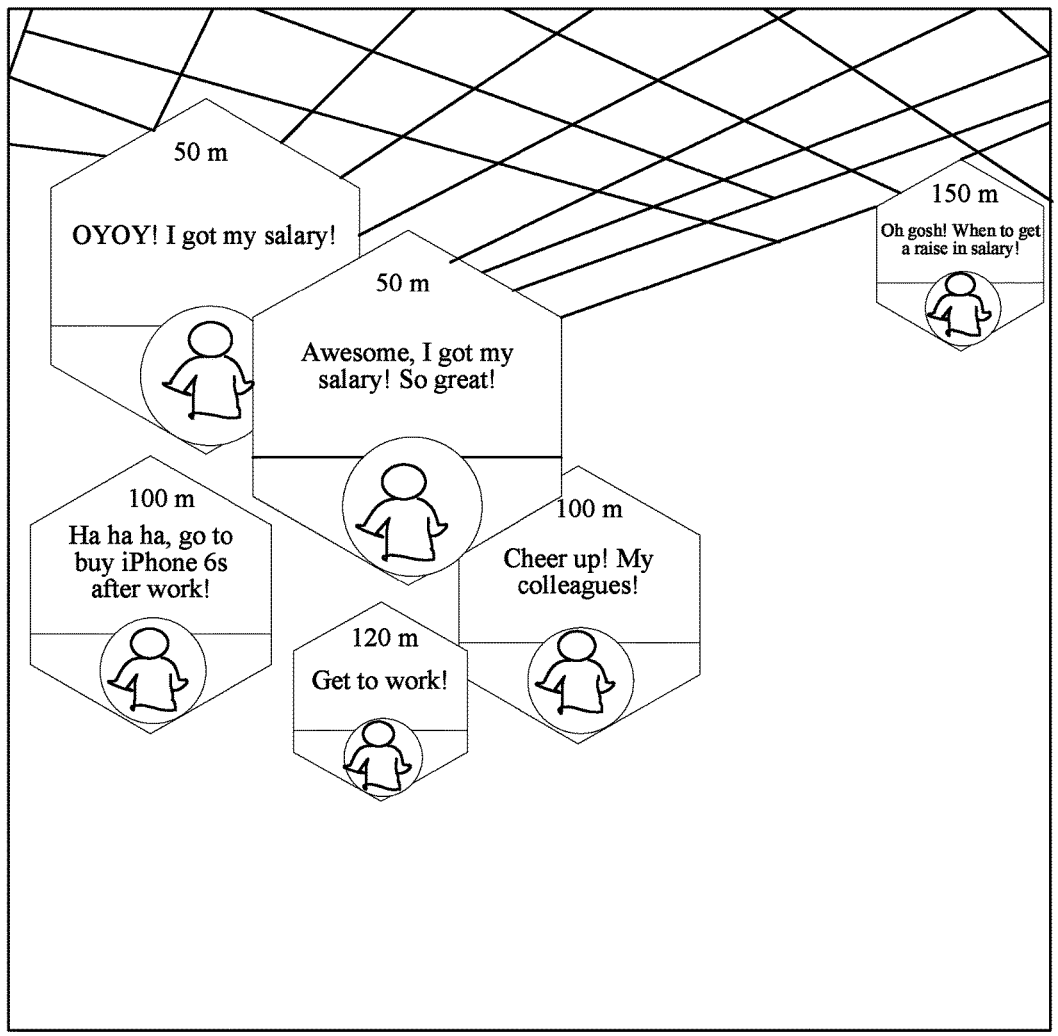
FIG. 5b is a schematic diagram of a first terminal using a real image of an office as a background image according to an embodiment of this application.

As shown in FIG. 4, FIG. 5a, and FIG. 5b, the first real image is displayed on the first terminal as the background image, and the presentation information is displayed in the first real image. FIG. 4 shows an image of a scenic spot as a background image, FIG. 5a shows an image of a restaurant as a background image, and FIG. 5b shows an image of an office as a background image. To highlight the presentation information on the first terminal, blur processing is performed on the first real image used as the background image, so that the first real image is blurry to some extents. The first real image may also be processed in another manner, for example, partial blurring is performed or a style of the first real image is set (such as daylight, autumn colors, a Korean style, or black and white).

In a specific example, the first real image may change with the season or light in one day, that is, in a same scenario, an image at a different time is used as the first real image.

In some examples, the obtaining a first real image corresponding to the first geographical location includes: obtaining the first real image that corresponds to the first geographical location and that is received by the first terminal from the server; or obtaining the first real image that is photographed by the first terminal at the first geographical location.

The first real image stored in the server may be an image photographed by the first terminal, the second terminal, or another terminal at the first geographical location, for example, a photo photographed when the second terminal sends the first information, or a photo photographed when the first terminal obtains the first information. The server stores, when storing the first information, the photo that is photographed when the first information is sent. If the server stores multiple first real images corresponding to the first geographical location, or there is no first real image corresponding to the first geographical location, a photo photographed at a geographical location closest to the first geographical location is selected as the background image.

The first real image may also be a real image photographed by a camera of the first terminal in real time. A user may select whether to enable the camera. If the camera is enabled, a real image photographed by the camera in real time is used as the background image. If the camera is not enabled, the first real image stored in the server is used as the background image.

In some examples, the first real image changes with the first geographical location. The first terminal obtains the first geographical location in real time by using a positioning function of the first terminal. Therefore, when the first real image changes in real time, information of a second terminal that is displayed in the first real image also changes in real time.

For example, when the first terminal is at a location A, the first terminal uses a real image of the location A as the background image, and displays presentation information of a second terminal B1 and a second terminal B2 in the background image. When the first terminal moves to a location C, the first terminal uses a real image of the location C as the background image, and displays presentation information of a second terminal B3, a second terminal B4, and a second terminal B5 in the background image. That is, the first real image changes with the first geographical location, and the presentation information displayed in the first real image also changes with the first geographical location.

In this embodiment, the first real image on the first terminal and the presentation information displayed in the first real image change with the first geographical location, thereby enhancing interaction experience between the real world and a virtual world. In addition, the first terminal automatically obtains information sent by a terminal nearby, without a need of performing search.

In a specific example, the second terminal may be a merchant (such as a restaurant, a cinema, a pub, a shopping mall, a hotel, a hospital, a supermarket, or a gym), and the first information sent by the second terminal may be advertisement information sent by the merchant or the like.

In some examples, the first real image used as the background image may be replaced by a map, and a location of the first terminal on the map is used as the background image.

Second Type: Default Image.

In some examples, the obtaining a background image corresponding to the second geographical location includes: obtaining a default background image corresponding to the second geographical location, where the default background image includes an auxiliary line used to represent the distance between the first geographical location and the second geographical location and/or an auxiliary line used to represent the range of the preset distance. The displaying the background image on the first terminal, and displaying the presentation information in the background image includes: displaying the default background image on the first terminal, and displaying the presentation information in the default background image of the first terminal.

Figure 6:
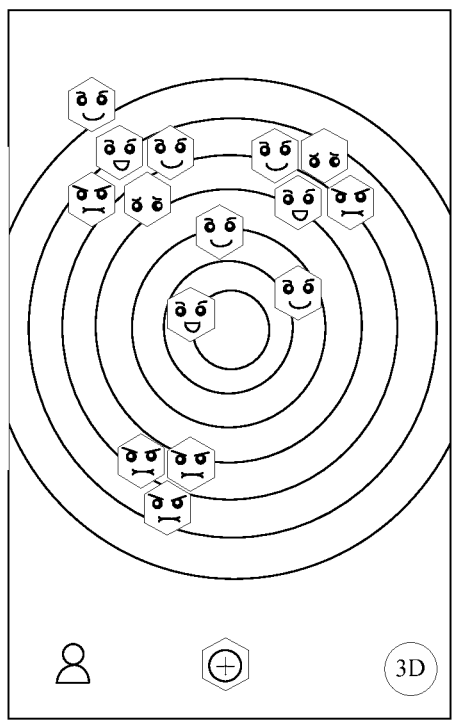
FIG. 6 is a schematic diagram of a first terminal using a radar line as a background image according to an embodiment of this application.
Figure 7:
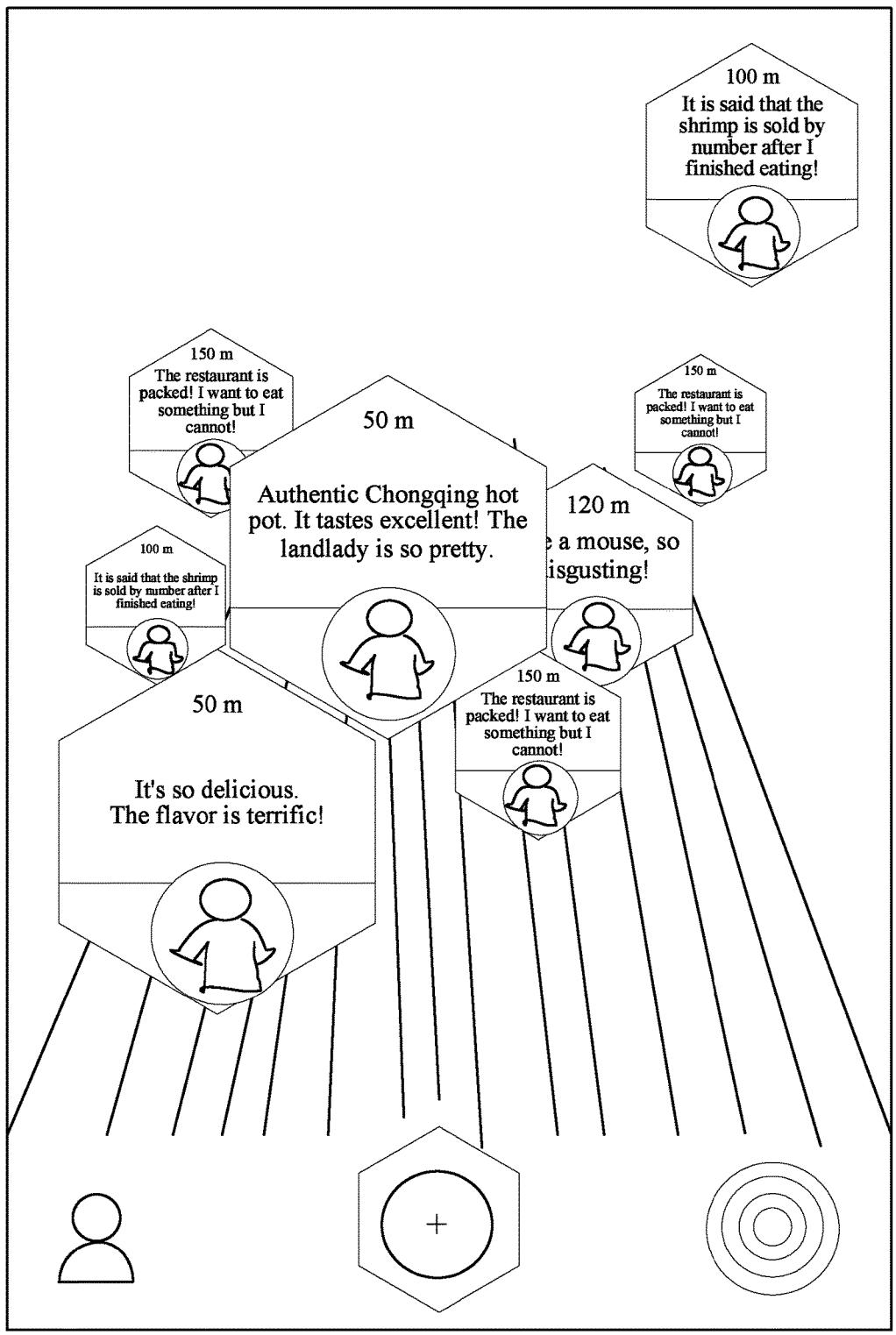
FIG. 7 is a schematic diagram of a first terminal using a longitudinal-depth line as a background image according to an embodiment of this application.

As shown in FIG. 6 and FIG. 7, an image having an auxiliary line is used as the default background image. The default background image includes at least two types: one type is a radar line shown in FIG. 6, and the other type is a longitudinal-depth line shown in FIG. 7. Certainly, an image having another auxiliary line that can represent a perspective effect may also be used as the default background image. This is not specifically limited herein. It is a 2D mode in FIG. 6, and may be switched to a 3D mode shown in FIG. 7 by using a "3D" identifier, or a 2D radar line in FIG. 6 may be switched to by using an identifier at the lower right corner of FIG. 7.

Further, the obtaining a default background image includes: obtaining a default background image having a first auxiliary line, where in the default background image having the first auxiliary line, radar lines are used to represent the distance between the second geographical location and the first geographical location and a direction of the second geographical location relative to the first geographical location; or obtaining a default background image having a second auxiliary line, where in the default background image having the second auxiliary line, longitudinal-depth lines are used to represent the distance between the second geographical location and the first geographical location, and a location of the second geographical location within the range of the preset distance.

As shown in FIG. 6, a center of the radar line represents the first geographical location of the first terminal, and the presentation information of the second terminal is displayed according to the distance and a directional relationship between the second geographical location and the first geographical location. Each hexagon represents one piece of first information and also represents a second geographical location at which a second terminal corresponding to the first information sends the first information.

As shown in FIG. 7, the longitudinal-depth lines may represent perspective relationships, a distance between longitudinal-depth lines that are relatively close to the first geographical location is relatively long, and a distance between longitudinal-depth lines that are relatively far away is relatively short. If a second geographical location is close to the first geographical location, presentation information is displayed in a part of longitudinal-depth lines whose distance therebetween is relatively long. If a second geographical location is far from the first geographical location, presentation information is displayed in a part of longitudinal-depth lines whose distance therebetween is relatively short. For the longitudinal-depth lines, particular transparency may be further used to enhance a sense of distance between different geographical locations.

In the foregoing embodiment, the user may select whether to use a real image as the background image or use a default image as the background image. When a real image is used as the background image, the user may select a real image prestored in the server or may choose to use a real image that is photographed by the first terminal in real time. When a default image is used as the background image, the user may select radar lines or longitudinal-depth lines to represent the second geographical location, the first geographical location, and the distance therebetween, or location relationships and distances between multiple second geographical locations.

In some examples, the displaying presentation information on a first terminal according to the second geographical location includes: obtaining a release time of the first information; determining whether a time difference between the release time of the first information and a current time satisfies a first preset value; and displaying the presentation information on the first terminal according to the second geographical location if the time difference between the release time of the first information and the current time satisfies the preset value.

If the time difference between the release time of the first information and the current time is very large (for example, several months or several years, which may be voluntarily set by the user), the first information is not displayed. If the time difference between the release time of the first information and the current time is relatively small and is within a range of the preset value, the first information is displayed.

In some examples, the displaying presentation information on a first terminal according to the second geographical location includes: determining whether a quantity of multiple pieces of information including the first information is greater than a preset quantity; and selecting, if the quantity of multiple pieces of information including the first information is greater than a preset quantity, first information from the multiple pieces of information including the first information, and displaying, on the first terminal, presentation information corresponding to the selected first information, where a time difference between a release time of the first information and a current time satisfies a second preset value.

When the first terminal obtains multiple pieces of information including the first information, if a quantity of the first information is excessively large, a preset quantity of first information may be selected from the multiple pieces of information for display. For example, if 25 pieces of information including the first information are obtained, 10 pieces of information including the first information are selected from the 25 pieces of information including the first information for display. In this case, the presentation information displayed on the first terminal is presentation information corresponding to the 10 pieces of first formation.

Further, when first information is selected, first information whose release time is relatively close to the current time is selected. For example, in the foregoing 25 pieces of information including the first information, if 15 pieces of information including the first information are released in 2015, and 10 pieces of information including the first information are released in 2016, the 10 pieces of information including the first information released in 2016 are displayed.

Displayed first information is limited through a time or a quantity, so that first information can be clearly displayed on the first terminal, a case in which first information cannot be displayed on the first terminal due to an excessively large quantity of first information is avoided, and processing pressure caused to display of the first terminal due to an excessively large quantity of first information is also reduced.

In some examples, the displaying presentation information on a first terminal according to the second geographical location includes: using the display location of the presentation information on the first terminal to represent the second geographical location. The presentation information may be in a form of a presentation box shown in FIG. 3 to FIG. 5, and FIG. 7. For example, FIG. 3 shows presentation information in front of the St. Paul's Cathedral to indicate locations at which first information is sent. The presentation information is displayed at corresponding locations on a background image, that is, the presentation information is displayed at locations to which second geographical locations are mapped on the background image, that is, the information is presented. In a scenario of a restaurant shown in FIG. 4, first information is sent at different locations of the restaurant, that is, the first information has been sent at second geographical locations of the restaurant. In this way, presentation information is displayed at locations that correspond to the second geographical locations and that are on a background image of the restaurant. In a scenario of an office shown in FIG. 5, first information is sent at different locations of the office, that is, the first information has been sent at second geographical locations of the office. In this way, presentation information is displayed at locations that correspond to the second geographical locations and that are on a background image of the office. The background image in FIG. 7 is an unreal image. Therefore, presentation information is also displayed at different locations on the background image, to represent second geographical locations.

The presentation information may be displayed in a form of a presentation box, for example, in a form of a polygon box in FIG. 4 to FIG. 7, or a text form may be used, or another form that can represent a message can be used. Details are not described herein.

The presentation information can present both the first information and the second geographical location, and may further present the distance between the second geographical location and the first geographical location. The distance may be displayed in a text form, for example, information such as 100 m or 50 m in the presentation box in FIG. 5a, FIG. 5b, and FIG. 7.

The distance may also be represented by using a size of a presentation box. Using a size of a presentation box to represent the distance between the second geographical location and the first geographical location is using the presentation box to represent the second geographical location. That is, in some examples, the displaying presentation information on a first terminal according to the second geographical location includes: using the display location of the presentation information on the first terminal and a displayed size of the presentation information on the first terminal to represent the distance between the second geographical location and the first geographical location.

FIG. 4, FIG. 5a, FIG. 5b, and FIG. 7 show presentation boxes of different sizes. A larger presentation box indicates a shorter distance between the second geographical location and the first geographical location, and a smaller presentation box indicates a longer distance between the second geographical location and the first geographical location.

The presentation box may also be in a form shown in FIG. 6. The first information is expressed by using an emotion in the presentation box, for example, pleasure, anger, sorrow, or joy. The second geographical location is represented by a location of the presentation box on a radar line. An emotion represented by a presentation box shown in FIG. 6 may also use a text form, an audio form, a video form, or the like. There is a "3D" identifier at the lower right corner of FIG. 6, and a 3D mode can be switched to by using the identifier.

The presentation information is displayed by using a presentation box, so that the displayed first information and second geographical location are more intuitive, a sense of space of a virtual world is enhanced, and user experience is improved.

In some examples, the displaying presentation information on a first terminal according to the second geographical location includes: detecting a touch operation on the presentation information displayed on the first terminal, where the touch operation includes one of the following: tap, double tap, or long press; and displaying a presentation result that is generated in response to the touch operation.

Figure 8:
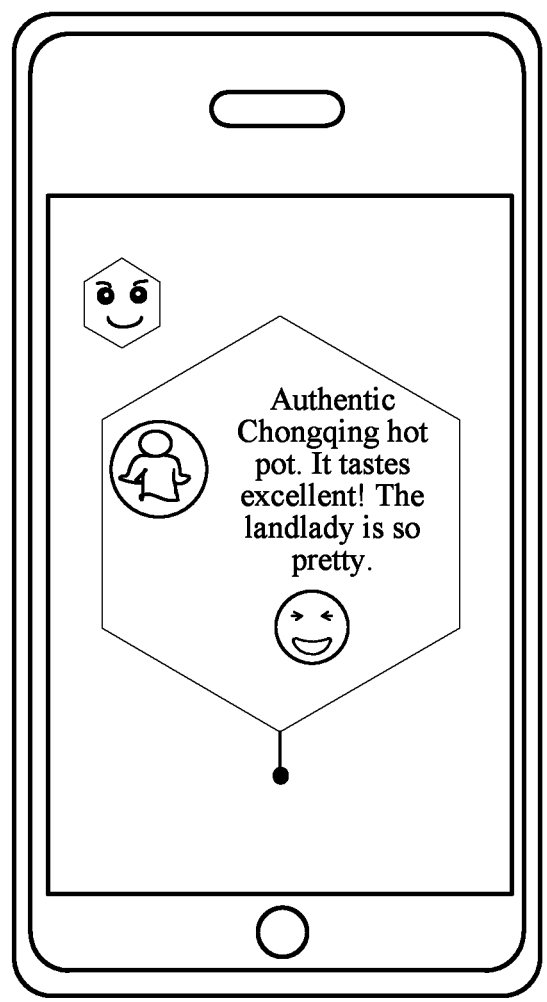
FIG. 8 is a schematic diagram of a presentation result according to an embodiment of this application.

After the touch operation is performed on the presentation information displayed on the first terminal, the presentation information is displayed in an extended manner, and a like operation, a comment and reply operation or the like is performed. Descriptions are provided with reference to FIG. 8. The first terminal detects the touch operation to extend the first information, which is extended to be in a form in FIG. 8 from a form in FIG. 5*b*. If a touch operation on a heart-shaped part in FIG. 8 is detected again, a like operation is completed for the first information.

If the touch operation on the presentation information displayed on the first terminal is detected, the presentation result can be displayed, so as to enhance interaction between the first terminal and the second terminal. The presentation result may use the first real image as a background image, or may use a map as a background image (not shown in FIG. 8).

In some examples, after the displaying presentation information on a first terminal according to the second geographical location, the method further includes: receiving an instruction for displaying the second information that is already sent by the first terminal; and displaying an information list on the first terminal according to the instruction, where the information list includes the second information that is already sent by the first terminal.

Figure 9:
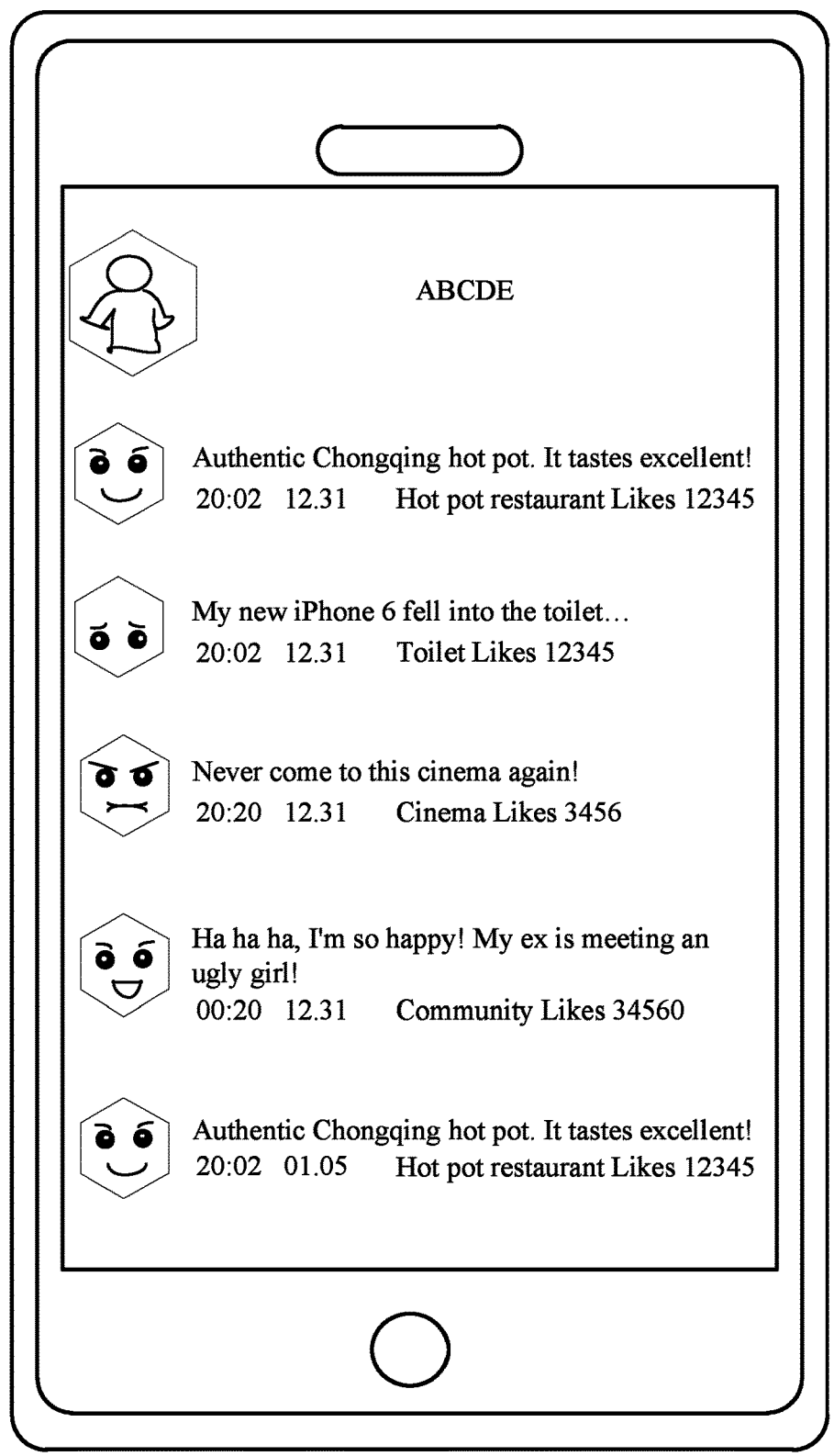
FIG. 9 is a schematic diagram of an information list displayed on a first terminal according to an embodiment of this application.

The first terminal may display the second information that is already sent by the first terminal, which may be displayed in a form of an information list shown in FIG. 9. After receiving the instruction, the first terminal searches, according to the instruction, for the second information that has been sent by the first terminal. The information list may display a sending time of the second information, an emotion to be expressed by the second information, content of the second information, a quantity of likes, a sending location, and the like.

The server records the second information sent by the first terminal, for the first terminal to view or generate a map according to a sending location of the second information, so as to identify a location that the first terminal passes through, record an emotion change in the second information sent by the first terminal, and the like, thereby enhancing interaction between information released by the terminal and the user.

In this embodiment, the presentation information and the background image may be displayed in a 2D or 3D manner.

It should be noted that, for brief description, the foregoing method embodiments are represented as a series of action combinations. However, a person skilled in the art should appreciate that this application is not limited to the described order of the actions, because according to this application, some operations may be performed in other orders or simultaneously. In addition, a person skilled in the art should also know that all the embodiments described in the specification are preferred embodiments, and the related actions and modules are not necessarily mandatory to this application.

Through the foregoing descriptions of the embodiments, a person skilled in the art may clearly understand that the method according to the foregoing embodiment may be implemented by software in addition to a necessary universal hardware platform and certainly may also be implemented by hardware. In most circumstances, the former is a preferred implementation. Based on such an understanding, the technical solutions of this application essentially or the part contributing to the existing technology may be implemented in a form of a software product. The computer software product is stored in a storage medium (such as a read-only medium (ROM)/a random access memory (RAM), a magnetic disk or an optical disc) and includes several instructions for instructing a terminal device (which may be a mobile phone, a computer, a server, or a network device) to perform the methods described in the embodiments of this application.

According to an embodiment of this application, an information display apparatus configured to implement the foregoing information display method is further provided. The information display apparatus is mainly configured to perform the information display method provided in the foregoing content of the embodiments of this application.

Figure 10:
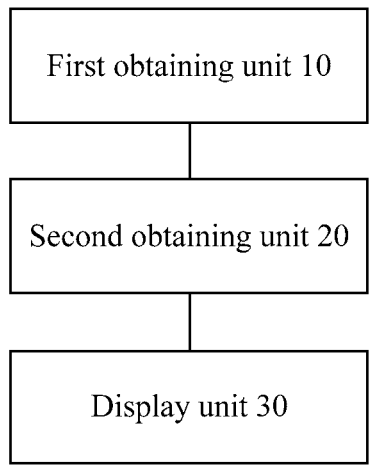
FIG. 10 is a schematic diagram of an information display apparatus according to an embodiment of this application.

As shown in FIG. 10, the apparatus includes: a first obtaining unit 10, a second obtaining unit 20, and a display unit 30.

The first obtaining unit 10 may provide, to the server, second information that is generated by the first terminal at a third geographical location and the third geographical location, so that the server associatively stores the second information and the third geographical location. The first obtaining unit 10 may further obtain a first geographical location of the first terminal, and provide the first geographical location to the server.

The second obtaining unit 20 may obtain, from the server, first information associated with a second geographical location whose distance to the first geographical location is within a range of a preset distance.

The display unit 30 may determine a display location of the first information on the first terminal according to the second geographical location, and display, at the display location, presentation information used to represent the first information.

The first obtaining unit 10 is configured to obtain the first geographical location of the first terminal. The first geographical location is a current location of the first terminal, and the first geographical location changes with movement of the first terminal.

The second obtaining unit 20 is configured to obtain the first information that is sent by a second terminal at the second geographical location, where the distance between the second geographical location of the second terminal and the first geographical location is within the range of the preset distance.

The first information may be text information, image information, video information, audio information, or the like. The second geographical location is a location at which the second terminal sends the first information. The second geographical location may also be information that is released by the second terminal at the third geographical location, and is information that is sent by the second terminal when the second terminal moves from the third geographical location to the second geographical location. That is, the second obtaining unit includes: a third obtaining module, configured to obtain shared information that is sent by the second terminal at the second geographical location, where the shared information is data shared by the second terminal at the second geographical location with the first terminal; or a fourth obtaining module, configured to obtain non-shared information that is sent by the second terminal at the second geographical location, where the non-shared information is released by the second terminal at the third geographical location, and when the second terminal moves from the third geographical location to the second geographical location, the second terminal sends the non-shared information at the second geographical location.

For example, the second terminal visits a scenic spot A in 2015, and releases "XXX is here" (that is, shared information) at the entrance of the scenic spot (that is, a second geographical location). The first terminal visits the scenic spot A in 2016, and obtains, near the entrance of the scenic spot, the information being "XXX is here" sent by the second terminal.

For example, the second terminal releases one piece of information being "I want to take a taxi to the Place" (that is, non-shared information) at an entrance of a restaurant (that is, a third geographical location). When the first terminal is at a crossroads (that is, a first geographical location), and the second terminal is located on the opposite side of a street of the crossroads at which the first terminal is located (that is, a second geographical location), a distance between the first terminal and the second terminal satisfies a range of a preset distance. In this case, the first terminal may obtain the information being "I want to take a taxi to the Place" that is released by the second terminal at the entrance of the restaurant. That is, the second terminal sends the information being "I want to take a taxi to the Place" at the crossroads, and the first terminal can obtain the information of the second terminal. If the first terminal also needs to take a taxi to the Place, or the first terminal is in a car heading to the Place, the first terminal may be invited, by using a message sent by the second terminal, to go to the Place together.

That is, the first information sent by the second terminal may be information that is already sent at the second geographical location (that is, shared information), or may be information carried by the second terminal at any time (that is, non-shared information), the second geographical location changes with movement of the second terminal, and when a requirement for the distance between the first geographical location and the second geographical location is satisfied, the information can be obtained by the first terminal.

The display unit 30 is configured to display the presentation information on the first terminal according to the second geographical location, where the presentation information is used to represent the first information.

The first information and the second geographical location sent by the second terminal are displayed on the first terminal. If the first terminal sends information at the first geographical location, the information sent by the first terminal is further displayed on the first terminal.

By means of the foregoing embodiment, the first information and the second geographical location at which the first information is sent are associatively recorded. Therefore, when the distance between the first geographical location of the first terminal and the second geographical location satisfies a requirement of the range of the preset distance, the first terminal can obtain the first information that is sent by the second terminal at the second geographical location. During display of the first terminal, the displayed presentation information represents the second geographical location of the second terminal. Therefore, a technical problem that a location of a terminal sending information cannot be accurately displayed is resolved, and a technical effect of accurately displaying the location of the terminal sending the information is achieved.

In this embodiment, a geographical location of the first terminal and a geographical location of the second terminal may be obtained in real time by using positioning functions of the terminals. In addition, the first terminal searches for the first information sent by the surrounding second terminal, and the first information of the second terminal can be obtained as long as the distance between the first geographical location and the second geographical location is within the range of the preset distance, thereby improving convenience of obtaining the first information by the first terminal.

In a specific example, if the second terminal sends, at a restaurant, "The baked rice in pineapple in this restaurant is very delicious", the first terminal can obtain the information when passing through the restaurant. Alternatively, if the second terminal releases, on the way to a restaurant, "Who will have dinner with me", when the distance between the first geographical location of the first terminal and the second geographical location is within the range of the preset distance, the information is obtained. The first terminal may send an invitation to dinner to the second terminal. The invitation to dinner may be replied to the information being "Who will have dinner with me" released by the second terminal, to invite the second terminal to dinner. As can be learned, in this embodiment, the first terminal may search, according to the first information, for a scenic spot, a restaurant, a cinema, or the like that interests the first terminal, and may further exchange social information with another terminal according to the first information.

In this embodiment, interaction experience in a virtual world is enhanced through the real world by means of an augmented reality technology, so that the virtual world is combined with the real world. The real world is virtualized, each space point in the virtual world is positioned by using a longitude and a latitude and an altitude, so that a location of a terminal in the real world is embodied in the virtual world, and information sent by the terminal in the real world is also associated with a space point in the virtual world.

In some examples, the display unit includes: a first obtaining module, configured to obtain a background image corresponding to the second geographical location; and a first display module, configured to: display the background image on the first terminal, and display the presentation information in the background image.

The background image is displayed on the first terminal, so that the presentation information is presented in the background image. Both the first information sent by the second terminal and information sent by the first terminal can be presented in the background image. In addition, the presentation information can present both the first information and the second geographical location at which the first information is sent.

The background image may use a real image or a default image. A real image may be an image photographed by the first terminal, the second terminal, or another terminal at the first geographical location, and may be photographed in real time or may be prestored in the server. A default image may be an image generated by the server. Such two types of background images are respectively described below.

First Type: Real Image.

In some examples, the first obtaining module includes a first obtaining submodule, where the first obtaining submodule is configured to: obtain a first real image corresponding to the first geographical location, and use the first real image as the background image; and the first display module includes a first display submodule, where the first display submodule is configured to: display the first real image on the first terminal, and display the presentation information in the first real image of the first terminal.

As shown in FIG. 4, FIG. 5a, and FIG. 5b, the first real image is displayed on the first terminal as the background image, and the presentation information is displayed in the first real image. FIG. 4 shows an image of a scenic spot as a background image, FIG. 5a shows an image of a restaurant as a background image, and FIG. 5b shows an image of an office as a background image. To highlight the presentation information on the first terminal, blur processing is performed on the first real image used as the background image, so that the first real image is blurry to some extents. The first real image may also be processed in another manner, for example, partial blurring is performed or a style of the first real image is set (such as daylight, autumn colors, a Korean style, or black and white).

In a specific example, the first real image may change with the season or light in one day, that is, in a same scenario, an image at a different time is used as the first real image.

In some examples, the first obtaining submodule is further configured to obtain the first real image that corresponds to the first geographical location and that is received by the first terminal from the server; or obtain the first real image that is photographed by the first terminal at the first geographical location.

The first real image stored in the server may be an image photographed by the first terminal, the second terminal, or another terminal at the first geographical location, for example, a photo photographed when the second terminal sends the first information, or a photo photographed when the first terminal obtains the first information. The server stores, when storing the first information, the photo that is photographed when the first information is sent. If the server stores multiple first real images corresponding to the first geographical location, or there is no first real image corresponding to the first geographical location, a photo photographed at a geographical location closest to the first geographical location is selected as the background image.

The first real image may also be a real image photographed by a camera of the first terminal in real time. A user may select whether to enable the camera. If the camera is enabled, a real image photographed by the camera in real time is used as the background image. If the camera is not enabled, the first real image stored in the server is used as the background image.

In some examples, the first real image changes with the first geographical location.

The first terminal obtains the first geographical location in real time by using a positioning function of the first terminal. Therefore, when the first real image changes in real time, information of a second terminal that is displayed in the first real image also changes in real time.

For example, when the first terminal is at a location A, the first terminal uses a real image of the location A as the background image, and displays presentation information of a second terminal B1 and a second terminal B2 in the background image. When the first terminal moves to a location C, the first terminal uses a real image of the location C as the background image, and displays presentation information of a second terminal B3, a second terminal B4, and a second terminal B5 in the background image. That is, the first real image changes with the first geographical location, and the presentation information displayed in the first real image also changes with the first geographical location.

In this embodiment, the first real image on the first terminal and the presentation information displayed in the first real image change with the first geographical location, thereby enhancing interaction experience between the real world and a virtual world. In addition, the first terminal automatically obtains information sent by a terminal nearby, without a need of performing search.

In a specific example, the second terminal may be a merchant (such as a restaurant, a cinema, a pub, a shopping mall, a hotel, a hospital, a supermarket, or a gym), and the first information sent by the second terminal may be advertisement information sent by the merchant or the like.

In some examples, the first real image used as the background image may be replaced by a map, and a location of the first terminal on the map is used as the background image.

Second Type: Default Image.

In some examples, the first obtaining module includes a second obtaining submodule, where the second obtaining submodule is configured to obtain a default background image corresponding to the second geographical location, where the default background image includes an auxiliary line used to represent the distance between the first geographical location and the second geographical location and/or an auxiliary line used to represent the range of the preset distance. The first display module includes a second display submodule, where the second display submodule is configured to: display the default background image on the first terminal, and display the presentation information in the default background image of the first terminal.

As shown in FIG. 6 and FIG. 7, an image having an auxiliary line is used as the default background image. The default background image includes at least two types: one type is a radar line shown in FIG. 6, and the other type is a longitudinal-depth line shown in FIG. 7. Certainly, an image having another auxiliary line that can represent a perspective effect may also be used as the default background image. This is not specifically limited herein. It is a 2D mode in FIG. 6, and may be switched to a 3D mode shown in FIG. 7 by using a "3D" identifier, or a 2D radar line in FIG. 6 may be switched to by using an identifier at the lower right corner of FIG. 7.

Further, the display unit includes: a second obtaining module, configured to obtain a release time of the first information; a first determining module, configured to determine whether a time difference between the release time of the first information and a current time satisfies a first preset value; and a second display module, configured to display the presentation information on the first terminal according to the second geographical location when the time difference between the release time of the first information and the current time satisfies the first preset value.

If the time difference between the release time of the first information and the current time is very large (for example, several months or several years, which may be voluntarily set by the user), the first information is not displayed. If the time difference between the release time of the first information and the current time is relatively small and is within a range of the preset value, the first information is displayed.

In some examples, the display unit includes: a second determining module, configured to determine whether a quantity of multiple pieces of information including the first information is greater than a preset quantity; and a selection module, configured to: select, when the quantity of multiple pieces of information including the first information is greater than a preset quantity, first information from the multiple pieces of information including the first information, and display, on the first terminal, presentation information corresponding to the selected first information, where a time difference between a release time of the first information and a current time satisfies a second preset value.

When the first terminal obtains multiple pieces of information including the first information, if a quantity of the first information is excessively large, a preset quantity of first information may be selected from the multiple pieces of information for display. For example, if 25 pieces of information including the first information are obtained, 10 pieces of information including the first information are selected from the 25 pieces of information including the first information for display. In this case, the presentation information displayed on the first terminal is presentation information corresponding to the 10 pieces of first formation.

Further, when first information is selected, first information whose release time is relatively close to the current time is selected. For example, in the foregoing 25 pieces of information including the first information, if 15 pieces of information including the first information are released in 2015, and 10 pieces of information including the first information are released in 2016, the 10 pieces of information including the first information released in 2016 are displayed.

Displayed first information is limited through a time or a quantity, so that first information can be clearly displayed on the first terminal, a case in which first information cannot be displayed on the first terminal due to an excessively large quantity of first information is avoided, and processing pressure caused to display of the first terminal due to an excessively large quantity of first information is also reduced.

In some examples, the display unit is further configured to use the display location of the presentation information on the first terminal to represent the second geographical location.

The presentation information may be in a form of a presentation box shown in FIG. 4, FIG. 5a, FIG. 5b, and FIG. 7. For example, FIG. 4 shows presentation information in front of the St. Paul's Cathedral to indicate locations at which first information is sent. The presentation information is displayed at corresponding locations on a background image, that is, the presentation information is displayed at locations to which second geographical locations are mapped on the background image, that is, the information is presented. In a scenario of a restaurant shown in FIG. 5, first information is sent at different locations of the restaurant, that is, the first information has been sent at second geographical locations of the restaurant. In this way, presentation information is displayed at locations that correspond to the second geographical locations and that are on a background image of the restaurant. In a scenario of an office shown in FIG. 5b, first information is sent at different locations of the office, that is, the first information has been sent at second geographical locations of the office. In this way, presentation information is displayed at locations that correspond to the second geographical locations and that are on a background image of the office. The background image in FIG. 7 is an unreal image. Therefore, presentation information is also displayed at different locations on the background image, to represent second geographical locations.

The presentation information may be displayed in a form of a presentation box, for example, in a form of a polygon box in FIG. 4 to FIG. 7, or a text form may be used, or another form that can represent a message can be used. Details are not described herein.

The presentation information can present both the first information and the second geographical location, and may further present the distance between the second geographical location and the first geographical location. The distance may be displayed in a text form, for example, information such as 100 m or 50 m in the presentation box in FIG. 5a, FIG. 5b, and FIG. 7.

The distance may also be represented by using a size of a presentation box. Using a size of a presentation box to represent the distance between the second geographical location and the first geographical location is using the presentation box to represent the second geographical location. That is, in some examples, the display unit is further configured to use the display location of the presentation information on the first terminal and a displayed size of the presentation information on the first terminal to represent the distance between the second geographical location and the first geographical location.

FIG. 4, FIG. 5a, FIG. 5b, and FIG. 7 show presentation boxes of different sizes. A larger presentation box indicates a shorter distance between the second geographical location and the first geographical location, and a smaller presentation box indicates a longer distance between the second geographical location and the first geographical location.

The presentation box may also be in a form shown in FIG. 6. The first information is expressed by using an emotion in the presentation box, for example, pleasure, anger, sorrow, or joy. The second geographical location is represented by a location of the presentation box on a radar line. An emotion represented by a presentation box shown in FIG. 6 may also use a text form, an audio form, a video form, or the like. There is a "3D" identifier at the lower right corner of FIG. 6, and a 3D mode can be switched to by using the identifier.

The presentation information is displayed by using a presentation box, so that the displayed first information and second geographical location are more intuitive, a sense of space of a virtual world is enhanced, and user experience is improved.

In some examples, the display unit includes: a detection module, configured to detect a touch operation on the presentation information displayed on the first terminal, where the touch operation includes one of the following: tap, double tap, or long press; and a third display module, configured to display a presentation result that is generated in response to the touch operation.

After the touch operation is performed on the presentation information displayed on the first terminal, the presentation information is displayed in an extended manner, and a like operation, a comment and reply operation or the like is performed. Descriptions are provided with reference to FIG. 8. The first terminal detects the touch operation to extend the first information, which is extended to be in a form in FIG. 8 from a form in FIG. 5b. If a touch operation on a heart-shaped part in FIG. 8 is detected again, a like operation is completed for the first information.

If the touch operation on the presentation information displayed on the first terminal is detected, the presentation result can be displayed, so as to enhance interaction between the first terminal and the second terminal. The presentation result may use the first real image as a background image, or may use a map as a background image (not shown in FIG. 8).

In some examples, the apparatus further includes: a receiving unit, configured to: receive, after the presentation information is displayed on the first terminal according to the second geographical location, an instruction for displaying the second information that is already sent by the first terminal; and a list presentation unit, configured to display an information list on the first terminal according to the instruction, where the information list includes the second information that is already sent by the first terminal.

The first terminal may display the second information that is already sent by the first terminal, which may be displayed in a form of an information list shown in FIG. 9. After receiving the instruction, the first terminal searches, according to the instruction, for the second information that has been sent by the first terminal. The information list may display a sending time of the second information, an emotion to be expressed by the second information, content of the second information, a quantity of likes, a sending location, and the like.

The server records the second information sent by the first terminal, for the first terminal to view or generate a map according to a sending location of the second information, so as to identify a location that the first terminal passes through, record an emotion change in the second information sent by the first terminal, and the like, thereby enhancing interaction between information released by the terminal and the user.

In this embodiment, the presentation information and the background image may be displayed in a 2D or 3D manner.

Figure 11:
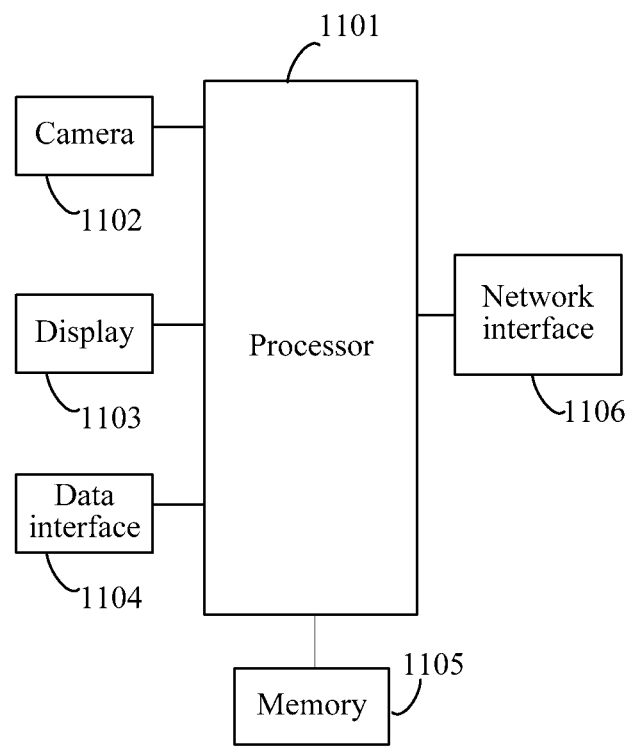
FIG. 11 is a diagram of a hardware structure of a terminal according to an embodiment of this application.

According to an embodiment of this application, a terminal configured to implement the reality-augmented information display method is further provided. As shown in FIG. 11, the terminal mainly includes a processor 1101, a camera 1102, a display 1103, a data interface 1104, memory 1105, and a network interface 1106.

The camera 1102 is mainly configured to photograph a first real image.

The display 1103 is mainly configured to display a background image and presentation information.

The data interface 1104 is mainly configured to obtain the photographed first real image from a third-party device.

The memory 1105 is mainly configured to store a first geographical location of a first terminal and information exchanged between a server and a second terminal.

The network interface 1106 is mainly configured to perform network communication with the server, to obtain second information and a second geographical location of the second terminal.

The processor 1101 is mainly configured to perform the following operations: obtaining the first geographical location of the first terminal; obtaining first information that is sent by the second terminal at the second geographical location, where a distance between the second geographical location of the second terminal and the first geographical location is within a range of a preset distance; and displaying the presentation information on the first terminal according to the second geographical location, the presentation information being used to represent the first information.

In some examples, the memory 1105 may further store a plurality of computer-readable instructions, which can enable the processor 1101 to complete the following operations when the processor 1101 executes the computer-readable instructions: obtaining the first geographical location of the first terminal, and providing the first geographical location to the server; obtaining, from the server, first information associated with the second geographical location whose distance to the first geographical location is within a range of a preset distance; determining a display location of the first information on the first terminal according to the second geographical location, and displaying, at the display location, presentation information used to represent the first information; and providing, to the server, second information that is generated by the first terminal at a third geographical location and the third geographical location, so that the server associatively stores the second information and the third geographical location.

In some examples, the processor 1101 is further configured to perform the following operations: obtaining a background image corresponding to the second geographical location; and displaying the background image on the first terminal, and displaying the presentation information in the background image.

In some examples, the processor 1101 is further configured to perform the following operations: the obtaining a background image corresponding to the second geographical location includes: obtaining a first real image corresponding to the first geographical location, and using the first real image as the background image. The displaying the background image on the first terminal, and displaying the presentation information in the background image includes: displaying the first real image on the first terminal, and displaying the presentation information in the first real image of the first terminal.

In some examples, the processor 1101 is further configured to perform the following operation: obtaining the first real image that corresponds to the first geographical location and that is received by the first terminal from the server; or obtaining the first real image that is photographed by the first terminal at the first geographical location.

In some examples, the processor 1101 is further configured to perform the following operation: the first real image changes with the first geographical location.

In some examples, the processor 1101 is further configured to perform the following operation: the first real image changes with the first geographical location.

In some examples, the processor 1101 is further configured to perform the following operations: the obtaining a background image corresponding to the second geographical location includes: obtaining a default background image corresponding to the second geographical location, where the default background image includes an auxiliary line used to represent the distance between the first geographical location and the second geographical location and/or an auxiliary line used to represent the range of the preset distance. The displaying the background image on the first terminal, and displaying the presentation information in the background image includes: displaying the default background image on the first terminal, and displaying the presentation information in the default background image of the first terminal.

In some examples, the processor 1101 is further configured to perform the following operations: obtaining a release time of the first information; determining whether a time difference between the release time of the first information and a current time satisfies a first preset value; and displaying the presentation information on the first terminal according to the second geographical location if the time difference between the release time of the first information and the current time satisfies the first preset value.

In some examples, the processor 1101 is further configured to perform the following operations: obtaining a default background image, where the default background image includes an auxiliary line used to represent the distance between the first geographical location and the second geographical location and an auxiliary line used to represent the range of the preset distance; and displaying the default background image on the first terminal, and displaying the presentation information in the default background image of the first terminal.

In some examples, the processor 1101 is further configured to perform the following operations: obtaining a default background image having a first auxiliary line, where in the default background image having the first auxiliary line, radar lines are used to represent the distance between the second geographical location and the first geographical location and a direction of the second geographical location relative to the first geographical location; or obtaining a default background image having a second auxiliary line, where in the default background image having the second auxiliary line, longitudinal-depth lines are used to represent the distance between the second geographical location and the first geographical location, and a location of the second geographical location within the range of the preset distance.

In some examples, the processor 1101 is further configured to perform the following operations: determining whether a quantity of multiple pieces of information including the first information is greater than a preset quantity; and selecting, if the quantity of multiple pieces of information including the first information is greater than a preset quantity, first information from the multiple pieces of information including the first information, and displaying, on the first terminal, presentation information corresponding to the selected first information, where a time difference between a release time of the first information and a current time satisfies a second preset value.

In some examples, the processor 1101 is further configured to perform the following operation: using the display location of the presentation information on the first terminal to represent the second geographical location.

In some examples, the processor 1101 is further configured to perform the following operation: using the display location of the presentation information on the first terminal and a displayed size of the presentation information on the first terminal to represent the distance between the second geographical location and the first geographical location.

In some examples, the processor 1101 is further configured to perform the following operations: detecting a touch operation on the presentation information displayed on the first terminal, where the touch operation includes one of the following: tap, double tap, or long press; and displaying a presentation result that is generated in response to the touch operation.

In some examples, the processor 1101 is further configured to perform the following operations: after the displaying presentation information on a first terminal according to the second geographical location, the method further includes: receiving an instruction for displaying the second information that is already sent by the first terminal; and displaying an information list on the first terminal according to the instruction, where the information list includes the second information that is already sent by the first terminal.

In some examples, the processor 1101 is further configured to perform the following operations: obtaining shared information that is sent by the second terminal at the second geographical location, where the shared information is data shared by the second terminal at the second geographical location with the first terminal; or obtaining non-shared information that is sent by the second terminal at the second geographical location, where the non-shared information is released by the second terminal at the third geographical location, and when the second terminal moves from the third geographical location to the second geographical location, the second terminal sends the non-shared information at the second geographical location.

In some examples, for a specific example in this embodiment, refer to the foregoing example in the method, and details are not described again in this embodiment.

An embodiment of this application further provides a storage medium. In some examples, in this embodiment, the storage medium may be configured to store program code in the information display method according to the embodiments of this application.

In some examples, in this embodiment, the storage medium may be located in at least one network device in multiple network devices in a network of a mobile communications network, a wide area network, a metropolitan area network, or a local area network.

In some examples, in this embodiment, the storage medium is set to store program code used to perform the following operations:

S1: Obtain a first geographical location of a first terminal.

S2: Obtain first information that is sent by a second terminal at a second geographical location, where a distance between the second geographical location of the second terminal and the first geographical location is within a range of a preset distance.

S3: Display presentation information on a first terminal according to the second geographical location, where the presentation information is used to represent the first information.

In some examples, in this embodiment, the storage medium is set to store program code used to perform the following operations:

obtaining a first geographical location of a first terminal, and providing the first geographical location to a server;

obtaining, from the server, first information associated with a second geographical location whose distance to the first geographical location is within a range of a preset distance;

determining a display location of the first information on the first terminal according to the second geographical location, and displaying, at the display location, presentation information used to represent the first information; and providing, to the server, second information that is generated by the first terminal at a third geographical location and the third geographical location, so that the server associatively stores the second information and the third geographical location.

The storage medium may include, but is not limited to, any medium that can store program code, such as a USB flash drive, a ROM, a RAM, a removable hard disk, a magnetic disk, or an optical disc.

In some examples, for a specific example in this embodiment, refer to the examples described in Embodiment 1 and Embodiment 2, and details are not described again in this embodiment.

The sequence numbers of the foregoing embodiments of this application are merely for illustrative purposes, and are not intended to indicate priorities of the embodiments.

When the integrated unit in the embodiments is implemented in the form of a software functional unit and sold or used as an independent product, the integrated unit may be stored in the non-transitory computer-readable storage medium. Based on such an understanding, the technical solutions of this application essentially, or the part contributing to the existing technology, or all or some of the technical solutions may be implemented in a form of a software product. The computer software product is stored in a storage medium and includes several instructions for instructing one or more computer devices (which may be a personal computer, a server, a network device, or the like) to perform all or some of the operations of the method described in the embodiments of this application.

In the foregoing embodiments of this application, the description of each embodiment has respective focuses. For a part that is not described in detail in an embodiment, refer to related descriptions in other embodiments.

In the several embodiments provided by this application, it should be understood that the disclosed client may be implemented in other manners. The described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

The foregoing descriptions are merely preferred implementations of this application. It should be noted that a person of ordinary skill in the art may make several improvements or refinements without departing from the principle of this application and the improvements or refinements shall fall within the protection scope of this application.

To sum up, the scope of the claims should not be limited to the implementations in the examples described above, and the specification should be considered as an entirety and explained in the broadest sense.

What is claimed is:

1. An information display method performed by a first terminal having at least one processor and memory storing at least one program to be executed by the at least one processor, wherein the first terminal has an associated camera and an associated display and is communicatively connected to a remote server, the method comprising:
    obtaining a first geographical location of the first terminal and a first orientation of the camera;
    transmitting the first geographical location and the first orientation to the server;
    receiving, from the server, first information, wherein the first information is released by a second terminal at a second geographical location that is within a region defined by the first geographical location and the first orientation, and wherein multiple pieces of information are released by one or more terminals at one or more geographical locations within the region;
    in accordance with a determination that a quantity of the multiple pieces of information within the region exceeds a preset quantity:
    after determining that a release time associated with the first information is within a predefined time window of a current time:
        determining a display location of the first information on the display of the first terminal according to the second geographical location within the region defined by the first geographical location and the first orientation; and
        displaying, at the display location, presentation information used to represent the first information while displaying a real-time image captured by the camera on the display; and
    after determining that the release time associated with the first information is not within the predefined time window of the current time:
        forgoing displaying the presentation information used to represent the first information.

2. The method according to claim 1, further comprising:
    generating second information in response to a user instruction to the first terminal, the second information including a third geographical location of the first terminal; and
    submitting, to the server, the second information, wherein the server is configured to store the second information according to the third geographical location and a release time corresponding to the second information.

3. The method according to claim 2, wherein the second information includes a user-provided requirement for sharing the second information with another terminal submitting its geographical location and its camera's orientation to the server.

4. The method according to claim 1, wherein the determining a display location of the first information on the first terminal according to the second geographical location within the region defined by the first geographical location and the first orientation comprises:
    determining a directional relationship between the second geographical location and the first geographical location and the first orientation; and
    determining the display location in a display area of the first terminal according to the directional relationship.

5. The method according to claim 1, wherein the determining a display location of the first information on the first terminal according to the second geographical location within the region defined by the first geographical location and the first orientation comprises:
    determining a distance between the second geographical location and the first geographical location and an angle between the second geographical location and the first geographical location and the first orientation; and
    determining the display location in a display area of the first terminal according to the distance and the angle.

6. The method according to claim 1, wherein the displaying, at the display location, presentation information used to represent the first information while displaying a real-time image captured by the camera on the display comprises:
    overlaying the presentation information on top of the real-time image; and
    updating the display location of the presentation information on the display in accordance with a movement of the first terminal.

7. The method according to claim 1, wherein the presentation information used to represent the first information includes a snippet of the first information released by the second terminal, the method further comprising:
    obtaining a user selection of the presentation information on the display; and
    in response to the user selection, replacing the snippet of the first information with a full version of the first information on the display of the first terminal.

8. The method according to claim 1, wherein a size of the presentation information used to represent the first information on the first terminal is determined by a time difference between a corresponding release time of the first information and the current time.

9. The method according to claim 1, wherein the first terminal is associated with a first user identifier of a social networking application, which is transmitted to the server, and the server is configured to select the first information released by the second terminal when there is a pre-existing relationship between a user identifier of the social networking application associated with the second terminal and the first user identifier of the social networking application associated with the first terminal.

10. The method according to claim 9, wherein a size of the presentation information corresponding to the first information is determined by the pre-existing relationship between the user identifier of the social networking application associated with the second terminal and the first user identifier of the social networking application associated with the first terminal.

11. A first terminal having at least one processor, a camera, a display, memory and at least one program stored in the memory, wherein the first terminal is communicatively connected to a remote server, and the at least one program, when executed by the at least one processor, causes the first terminal to perform a plurality of operations comprising:
   obtaining a first geographical location of the first terminal and a first orientation of the camera;
   transmitting the first geographical location and the first orientation to the server;
   receiving, from the server, first information, wherein the first information is released by a second terminal at a second geographical location that is within a region defined by the first geographical location and the first orientation, and wherein multiple pieces of information are released by one or more terminals at one or more geographical locations within the region;
   in accordance with a determination that a quantity of the multiple pieces of information within the region exceeds a preset quantity:
   after determining that a release time associated with the first information is within a predefined time window of a current time:
      determining a display location of the first information on the display of the first terminal according to the second geographical location within the region defined by the first geographical location and the first orientation; and
      displaying, at the display location, presentation information used to represent the first information while displaying a real-time image captured by the camera on the display; and
   after determining that the release time associated with the first information is not within the predefined time window of the current time:
      forgoing displaying the presentation information used to represent the first information.

12. The first terminal according to claim 11, wherein the plurality of operations further comprise:
   generating second information in response to a user instruction to the first terminal, the second information including a third geographical location of the first terminal; and
   submitting, to the server, the second information, wherein the server is configured to store the second information according to the third geographical location and a release time corresponding to the second information.

13. The first terminal according to claim 11, wherein the operation of determining a display location of the first information on the first terminal according to the second geographical location within the region defined by the first geographical location and the first orientation comprises:
   determining a directional relationship between the second geographical location and the first geographical location and the first orientation; and
   determining the display location in a display area of the first terminal according to the directional relationship.

14. The first terminal according to claim 11, wherein the operation of determining a display location of the first information on the first terminal according to the second geographical location within the region defined by the first geographical location and the first orientation comprises:
   determining a distance between the second geographical location and the first geographical location and an angle between the second geographical location and the first geographical location and the first orientation; and
   determining the display location in a display area of the first terminal according to the distance and the angle.

15. The first terminal according to claim 11, wherein the operation of displaying, at the display location, presentation information used to represent the first information while displaying a real-time image captured by the camera on the display comprises:
   overlaying the presentation information on top of the real-time image; and
   updating the display location of the presentation information on the display in accordance with a movement of the first terminal.

16. The first terminal according to claim 11, wherein the first terminal is associated with a first user identifier of a social networking application, which is transmitted to the server, and the server is configured to select the first information released by the second terminal when there is a pre-existing relationship between a user identifier of the social networking application associated with the second terminal and the first user identifier of the social networking application associated with the first terminal.

17. A non-transitory computer-readable storage medium storing a plurality of computer executable instructions that, when at least one processor of a first terminal that has a camera and a display and that is communicatively connected to a remote server, cause the first terminal to perform the following operations:
   obtaining a first geographical location of the first terminal and a first orientation of the camera;
   transmitting the first geographical location and the first orientation to the server;
   receiving, from the server, first information, wherein the first information is released by a second terminal at a second geographical location that is within a region defined by the first geographical location and the first orientation, and wherein multiple pieces of information are released by one or more terminals at one or more geographical locations within the region;
   in accordance with a determination that a quantity of the multiple pieces of information within the region exceeds a preset quantity:
   after determining that a release time associated with the first information is within a predefined time window of a current time:
      determining a display location of the first information on the display of the first terminal according to the second geographical location within the region defined by the first geographical location and the first orientation; and
      displaying, at the display location, presentation information used to represent the first information while displaying a real-time image captured by the camera on the display; and
   after determining that the release time associated with the first information is not within the predefined time window of the current time:

forgoing displaying the presentation information used to represent the first information.

\* \* \* \* \*